US012079438B2

(12) United States Patent
Vernon et al.

(10) Patent No.: US 12,079,438 B2
(45) Date of Patent: *Sep. 3, 2024

(54) INTERACTIVE DISPLAY OF DATA DISTRIBUTIONS

(71) Applicant: Google LLC, Mountain View, CA (US)

(72) Inventors: Ryan Vernon, Mountain View, CA (US); Ali Abdelhadi, Mountain View, CA (US); Pedro Jorge Cunha Nunes, Mountain View, CA (US); Keith Simmons, Mountain View, CA (US); Ali Kashefian Naieni, Mountain View, CA (US); Sherzat Aitbayev, Mountain View, CA (US); Kimberly Faughnan, Mountain View, CA (US); Roman Nurik, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,431

(22) Filed: Jan. 7, 2023

(65) Prior Publication Data

US 2023/0142519 A1 May 11, 2023

Related U.S. Application Data

(63) Continuation of application No. 17/111,861, filed on Dec. 4, 2020, now Pat. No. 11,556,219, which is a (Continued)

(51) Int. Cl.
*G06F 3/0481* (2022.01)
*G06F 3/04842* (2022.01)
(Continued)

(52) U.S. Cl.
CPC ........ *G06F 3/0481* (2013.01); *G06F 3/04842* (2013.01); *G06F 3/04847* (2013.01);
(Continued)

(58) Field of Classification Search
CPC .............. G06F 3/0481; G06F 3/04842; G06F 3/04847; G06F 3/0485; G06T 11/206; G06T 2200/24
See application file for complete search history.

(56) References Cited

U.S. PATENT DOCUMENTS

| 2003/0128212 A1 | 7/2003 | Pitkow |
| 2004/0164983 A1* | 8/2004 | Khozai ................... G09B 5/00 345/440 |

(Continued)

OTHER PUBLICATIONS

Nicholas J. Cox, "Getting histograms with varying bin widths", Jun. 2003 [online], [retrieved on Aug. 24, 2018]. Retrieved from the Internet: <URL:https://web.archive.org/web/2013020704227/https://www.stata.com/support/faqs/graphics/histograms-with-varying-binwidths/>, 2 pages (Year: 2003).

*Primary Examiner* — KC Chen
(74) *Attorney, Agent, or Firm* — Honigman LLP; Brett A. Krueger

(57) ABSTRACT

A method includes displaying, via a graphical user interface (GUI), a first graphical representation of a dataset on a display screen in communication with the data processing hardware, the first graphical representation representing a statistical summary of the dataset. The method includes receiving, via the GUI, an indication of a user interaction. In response to the received indication of the user interaction, the method includes displaying, via the GUI, a second graphical representation of the dataset on the display screen, the second graphical representation representing a plurality of statistical summaries of the dataset, each respective statistical summary of the plurality of statistical summaries computed for a respective time period of a plurality of time periods.

16 Claims, 28 Drawing Sheets

Related U.S. Application Data continuation of application No. 15/982,720, filed on May 17, 2018, now Pat. No. 10,877,619.

(60) Provisional application No. 62/507,696, filed on May 17, 2017.

(51) Int. Cl.
*G06F 3/04847* (2022.01)
*G06F 3/0485* (2022.01)
*G06T 11/20* (2006.01)

(52) U.S. Cl.
CPC .......... *G06F 3/0485* (2013.01); *G06T 11/206* (2013.01); *G06T 2200/24* (2013.01)

(56) References Cited

U.S. PATENT DOCUMENTS

| | | |
|---|---|---|
| 2005/0206644 A1 | 9/2005 | Kincaid |
| 2010/0070904 A1 | 3/2010 | Zigon et al. |
| 2010/0079465 A1 | 4/2010 | Hsu et al. |
| 2012/0150446 A1* | 6/2012 | Chang .................. G06Q 10/10 702/3 |
| 2016/0098176 A1 | 4/2016 | Cervelli et al. |
| 2016/0117372 A1 | 4/2016 | Krafft |
| 2017/0357764 A1 | 12/2017 | Fauss et al. |

* cited by examiner

INTERACTIVE DISPLAY OF DATA DISTRIBUTIONS

CROSS REFERENCE TO RELATED APPLICATIONS

This U.S. Patent Application is a continuation of, and claims priority under 35 U.S.C. § 120 from U.S. patent application Ser. No. 17/111,861, filed on Dec. 4, 2020, now U.S. Pat. No. 11,556,219, which is a continuation of U.S. patent application Ser. No. 15/982,720, filed on May 17, 2018, now U.S. Pat. No. 10,877,619, which claims priority under 35 U.S.C. § 119(e) to U.S. Provisional Application 62/507,696, filed on May 17, 2017. The disclosures of these prior applications are considered part of the disclosure of this application and are hereby incorporated by reference in their entireties.

TECHNICAL FIELD

This disclosure relates to a system for an interactive display of data distributions.

BACKGROUND

A box-and-whisker plot is commonly used in print form to show distributions of data in a compact manner so one distribution can be compared to another. The plot is composed of a line or box with an indication of the median and second and third quartiles. The ends of the line generally represent the first and fourth quartiles. Electronic forms of a box-and-whisker plot typically follow the same format as print versions. However, the electronic form allows the opportunity to increase compactness while simultaneously increasing the amount of information the plot communicates to the user.

SUMMARY

One aspect of the disclosure provides a method that includes displaying, by data processing hardware, a first graphical representation on a screen in communication with the data processing hardware. The first graphical representation includes a box-and-whisker plot of a dataset. The method also includes receiving, at the data processing hardware, a first interaction indication indicating a graphical user interaction by a user at a first interaction location on the first graphical representation. In response to the received first interactive indication, the method includes displaying, by the data processing hardware, a second graphical representation on the screen based on the first interaction indication. The second graphical representation includes a density plot of the dataset that may have a respective scale equal to a corresponding scale of the box-and-whisker plot. The method further includes receiving, at the data processing hardware, a second interaction indication indicating the graphical user interaction by the user at a second interaction location on the second graphical representation. In response to the received second interactive indication, the method includes displaying, by the data processing hardware, an updated second graphical representation of the dataset on the screen based on the second interaction indication.

Implementations of the disclosure may include one or more of the following optional features. In some implementations, the first graphical representation includes an axis and the first interaction location includes a location within a threshold distance of the axis of the first graphical representation. The first interaction indication may include a location of an on-focus event triggered on the first graphical representation. The first interaction indication may also include a location of an input selection event triggered on the first graphical representation. The second interaction location includes a location on the second graphical representation that is different than the first interaction location. Additionally, the second interaction indication may include a location of an on-focus event triggered on the second graphical representation. In some examples, the second graphical indication includes a first graphical indication and the updated second graphical representation includes a second graphical indication that is different than the first graphical indication. The second interaction location may include a location on the density plot and the density plot may include a graphical indication of a data value corresponding to the second interaction location.

In some implementations, the method further includes receiving, at the data processing hardware, a third interaction indication indicating the graphical user interaction at a third interaction location on the second graphical representation. In response to the received third interaction indication, the method includes displaying, by the data processing hardware, the first graphical representation on the screen. In some examples, the density plot includes a plurality of rectangles, where each rectangle has an identical area and each rectangle has a height and a width based upon the dataset.

Another aspect of the disclosure provides a system for interactively displaying data distributions. The system includes data processing hardware and memory hardware in communication with the data processing hardware, the memory hardware storing instructions that when executed on the data processing hardware cause the data processing hardware to perform operations. The operations include displaying a first graphical representation on a screen in communication with the data processing hardware. The first graphical representation includes a box-and-whisker plot of a dataset. The operations also include receiving a first interaction indication indicating a graphical user interaction by a user at a first interaction location on the first graphical representation. In response to the received first interactive indication, the operations include displaying a second graphical representation on the screen based on the first interaction indication. The second graphical representation includes a density plot of the dataset that may have a respective scale equal to a corresponding scale of the box-and-whisker plot. The operations further include receiving a second interaction indication indicating the graphical user interaction by the user at a second interaction location on the second graphical representation. In response to the received second interactive indication, the operations include displaying an updated second graphical representation of the dataset on the screen based on the second interaction indication.

Implementations of the disclosure may include one or more of the following optional features. In some implementations, the operations also include the first graphical representation including an axis and the first interaction location including a location within a threshold distance of the axis of the first graphical representation. The operations may also may include where the first interaction indication includes a location of an on-focus event triggered on the first graphical representation. In some examples, the first interaction indication includes a location of an input selection event triggered on the first graphical representation. The second interaction location may include a location on the second graphical representation that is different than the first interaction location. The second interaction indication includes a location of an on-focus event triggered on the second graphical representation. The second graphical indication may include a first graphical indication and the updated second graphical representation may include a second graphical indication that is different than the first graphical indication. The second interaction location includes a location on the density plot and the density plot includes a graphical indication of a data value corresponding to the second interaction location.

In some implementations, the operations further include receiving a third interaction indication indicating the graphical user interaction at a third interaction location on the second graphical representation. In response to the received third interaction indication, the operations include displaying the first graphical representation on the screen. The density plot may include a plurality of rectangles, where each rectangle has an identical area and each rectangle has a height and a width based upon the dataset.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user may need to view and understand data from one or more datasets quickly and accurately. A common way of viewing and comparing data is in the form of box-and-whisker plots. However, other types of graphical representations of the same data can enhance understanding, such as density plots. Implementations herein are directed toward systems and methods for interactively displaying data distributions to allow a user to quickly focus on relevant portions of the data accurately and compactly.

Figure 1:
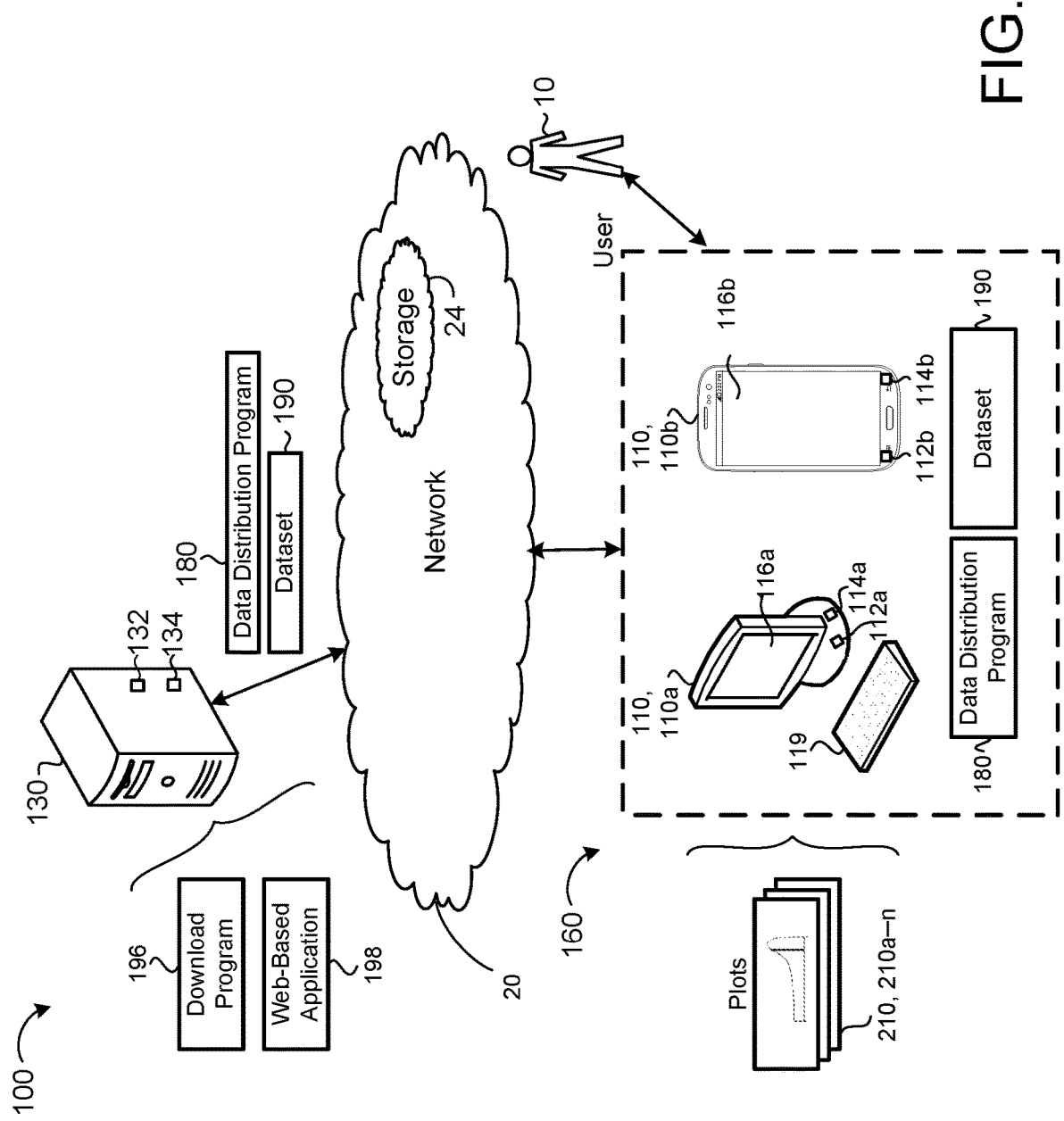
FIG. 1 is a schematic view of an example system for interactively displaying data distributions.

Referring to FIG. 1, in some implementations, an interactive data distribution display system 100 displays graphical representations of data distributions (e.g., plots) 210, 210a-n to a user 10 via a user device 110. The user device 110 may include, but is not limited to, desktop computers 110a or portable electronic device 110b (e.g., cellular phone, smartphone, smartwatch, personal digital assistant, etc.) or any other electronic device capable of sending, receiving, and displaying information. The user device 110a, 110b, includes data processing hardware 112a, 112b (e.g., a computing device that executes instructions), and non-transitory memory 114a, 114b and a display 116a, 116b (e.g., touch display or non-touch display) in communication with the data processor 112. In some examples, the user device 110a includes keyboard 119. The data processing hardware 112 may execute a data distribution program 180 that allows the user 10 to view graphical representations 210 via the displays 116a, 116b. For example, a first graphical representation 210a is a box-and-whisker-plot. The box-and-whisker-plot may include a box indicating the median and second and third quartiles and lines indicating the first and fourth quartiles, or alternatively, merely an indication of the median with lines indicating the first and fourth quartiles.

The data processing hardware 112 bases the graphical representations 210 on a dataset 190 that the data processing hardware 112 receives locally from non-transitory memory 114 or via network 20 (e.g., from storage 24). Optionally, the network 20 is connected to remote processing hardware 130 that includes data processor 132 and non-transitory memory 134. In some implementations, the remote processing hardware 130 provides the user 10 with the dataset 190 and/or the data distribution program 180. The user 10 may download 196 the data distribution program 180 from the remote processing hardware 130, or alternatively, the remote processing hardware 130 provides a web-based application 198 version of the data distribution program 180 (e.g., through a web browser).

Figure 2A:
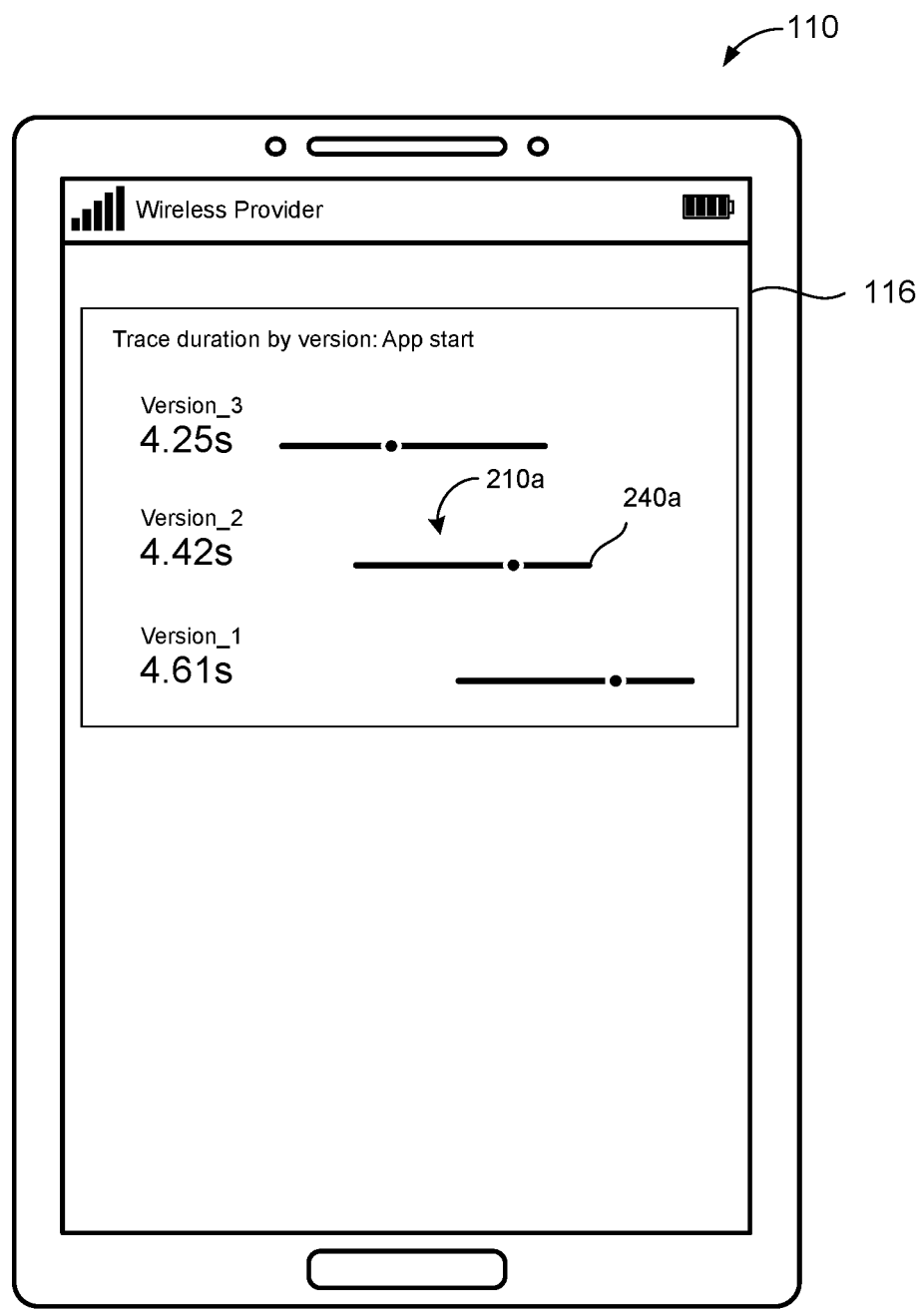
FIGS. 2A-2C are schematic views of example user device displays.
Figure 2B:
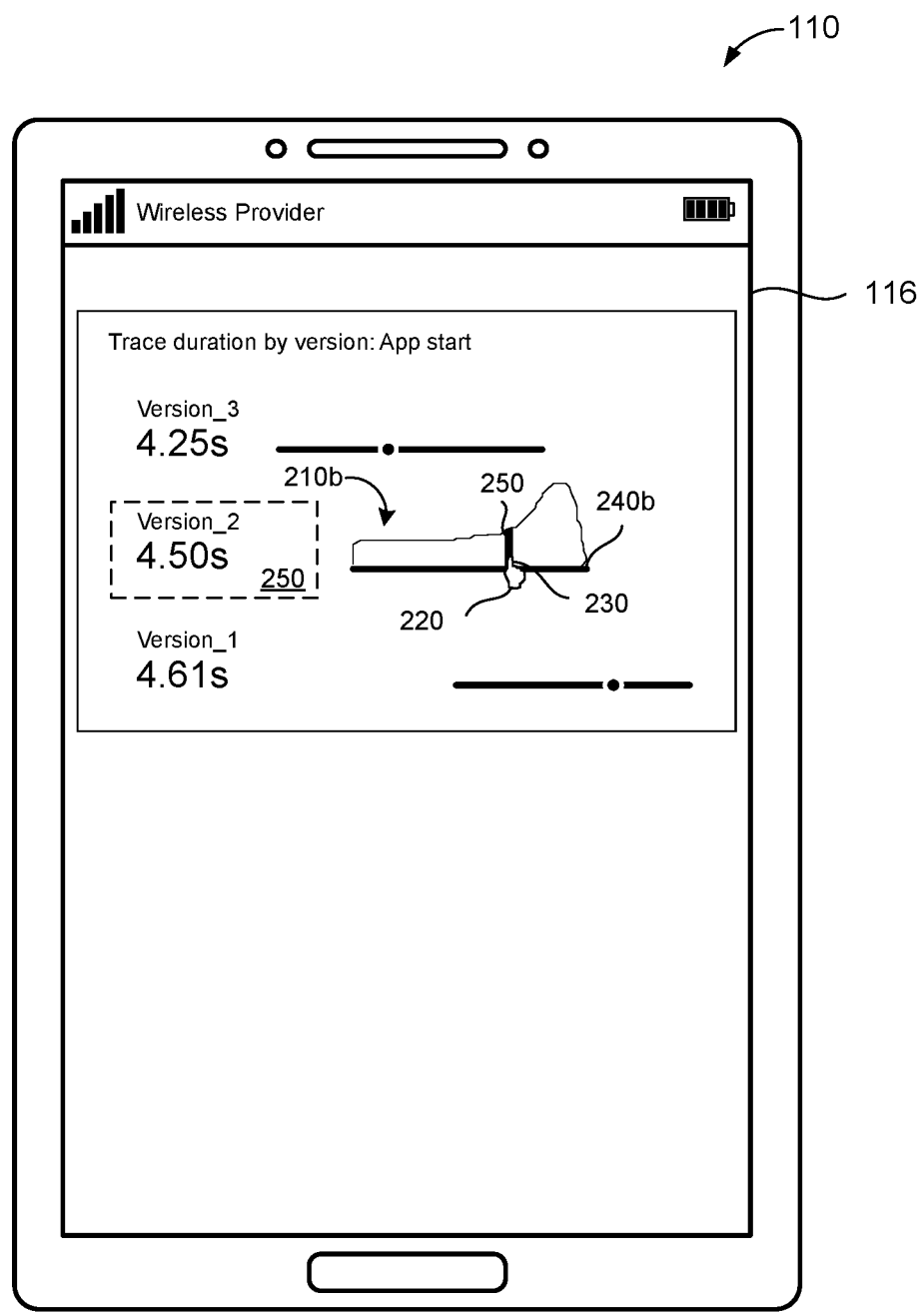
Figure 2C:
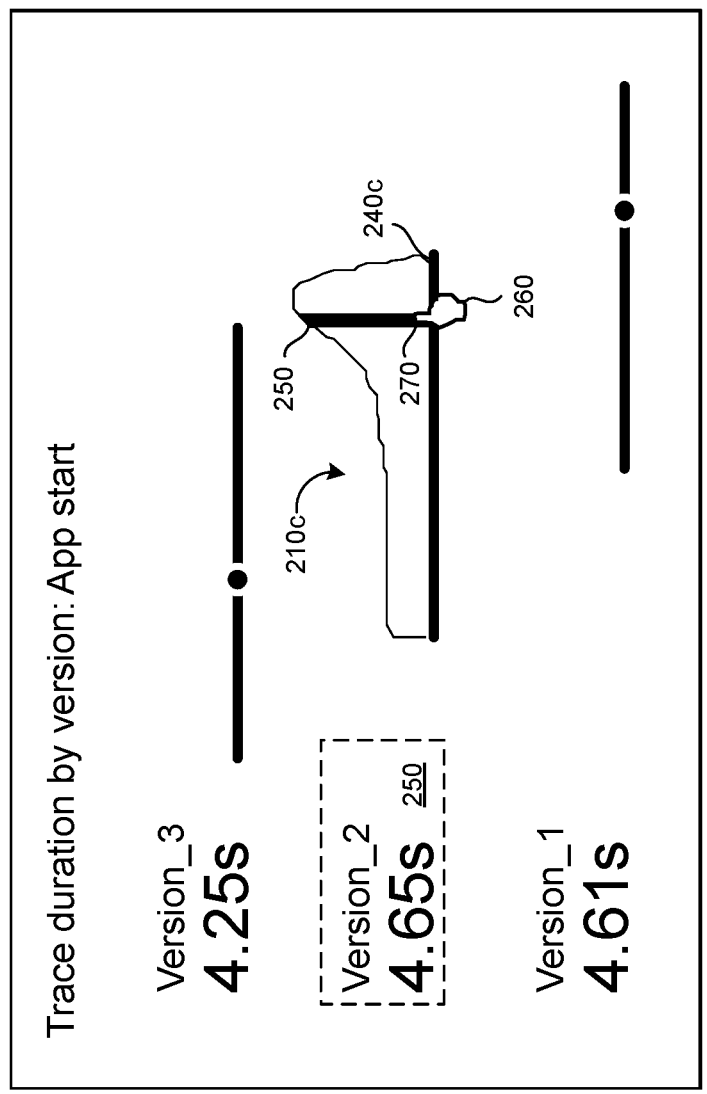

Referring now to FIGS. 2A and 2B, the data processing hardware 112 displays on the screen 116 of user device 110 the first graphical representation 210a (e.g., a box-and-whisker plot) of dataset 190 having axis 240a (FIG. 2A). As shown in FIG. 2B, the data processing hardware 112 receives a first interaction indication 220 indicating a graphical user interaction by the user 10 at a first interaction location 230 on the first graphical representation 210a. In response to receiving the first interactive indication 220, the data processing hardware 112 displays on screen 116 of user device 110 a second graphical representation 210b having axis 240b (FIG. 2B). The second graphical representation 210b is drawn from the same dataset 190 as the first graphical representation 210a, and may include the same plot, but with a different layer over the plot showing the line. The second graphical representation 210b may be a density plot. The second graphical representation 210b may have a respective scale that is equal to a corresponding scale of the first graphical representation 210a. Referring now to FIG. 2C, the data processing hardware 112 receives a second interaction indication 260 indicating the graphical user interaction by the user 10 at a second interaction location 270 and in response, data processing hardware 112 displays an updated second graphical representation 210c of the dataset 190 on the screen 116 of the user device 110. The updated second graphical representation 210c is based on the second interaction indication 260 at the second indication location 270.

The user 10 may continue interacting with the graphical representation (e.g., a second interaction indication, third interaction indication, etc.), all representative of the same graphical user interaction. The updated second graphical representation 210c may update a graphical indication 250, where the graphical indication 250 corresponds to the interaction location. The graphical indications 250, as illustrated, may be one or more graphical markings on the graphical representation (e.g., the vertical line) or text. For example, the user 10 may continue to interact with the graphical representation 210c at any point along axis 240c, and graphical indications 250 will update to reflect the corresponding interaction location of the dataset 190 represented by the graphical representation 210c. Additionally, the user 10 may switch back and forth between the box-and-whisker plot 210a of FIG. 2A and the density plots 210b, 210c of FIGS. 2B and 2C. For example, after displaying the updated second graphical representation 210c, the data processing hardware 112 may receive a third interaction indication from the user 10 that indicates the graphical user interaction at a third interaction location. In response, the data processing hardware 112 may again display the first graphical representation 210a on the screen 116. For example, the user 10 may position a cursor or other focus event a threshold distance away from the updated second graphical representation 210c and/or provide a user input with a mouse, keyboard, or touch display (e.g., hover event, a selection event, a press and hold event, etc.).

As previously discussed, the graphical representations 210 includes an axis 240a-c. In some examples, the interaction locations are limited to within a threshold distance from the axis 240a-c. For example, the first interaction location 230 may be required to be within the threshold distance to the axis 240a of the first graphical representation 210a before the data processing hardware 112 responds with displaying the second graphical representation 210b.

Still referring to FIGS. 2A and 2B, the interaction indication 220, in some implementations, includes a location of an on-focus event triggered on the first graphical representation 210a. For example, the user 10 may "hover" a mouse cursor over the graphical representation 210a, or touch the graphical representation 210a using a touch display. The interaction indication 220 may also include a location of an input selection event triggered on the first graphical representation 210a (e.g., the user 10 "clicking" a computer mouse or pressing a computer keyboard key).

A graphical representation such as a box-and-whisker plot 210a, when displayed on the screen 116 of the user device 110, may progressively display more information through user interaction. For example, the user interaction may be to "hover" a mouse cursor, tap a mouse button, tap a touch display, etc. This allows for faster loading and processing of the graphical representation while simultaneously keeping the interface simple. The plots may use a variety of colors, patterns, and line thicknesses to further precisely and compactly communicate information. Data with less importance may be hidden or abstracted via symbol use, while important data may be emphasized. Additionally, the user 10 may compare data easier and view data on a smaller screen than traditional representations would allow.

Figure 3A:
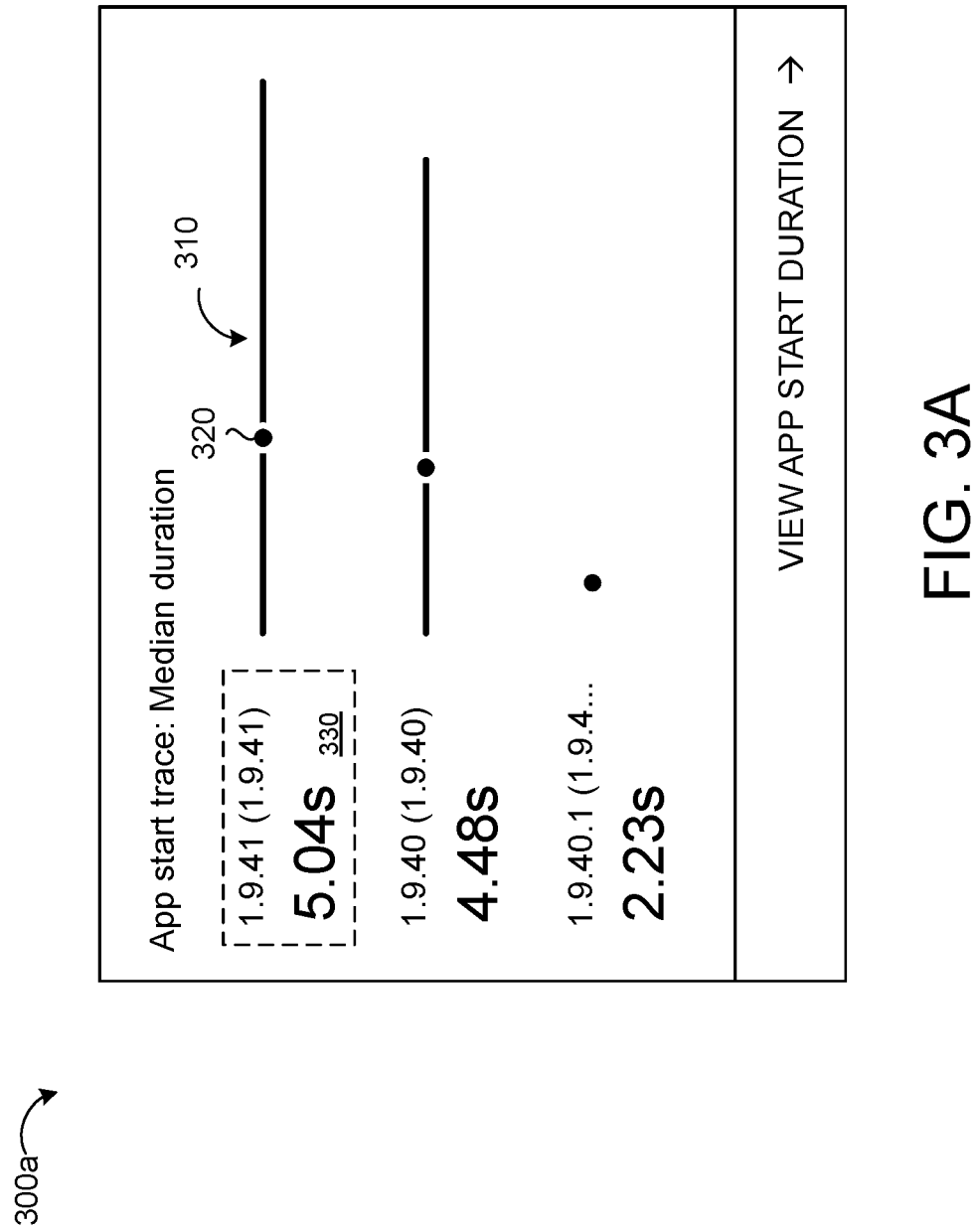
FIGS. 3A and 3B are schematic views of an example user interaction.
Figure 3B:
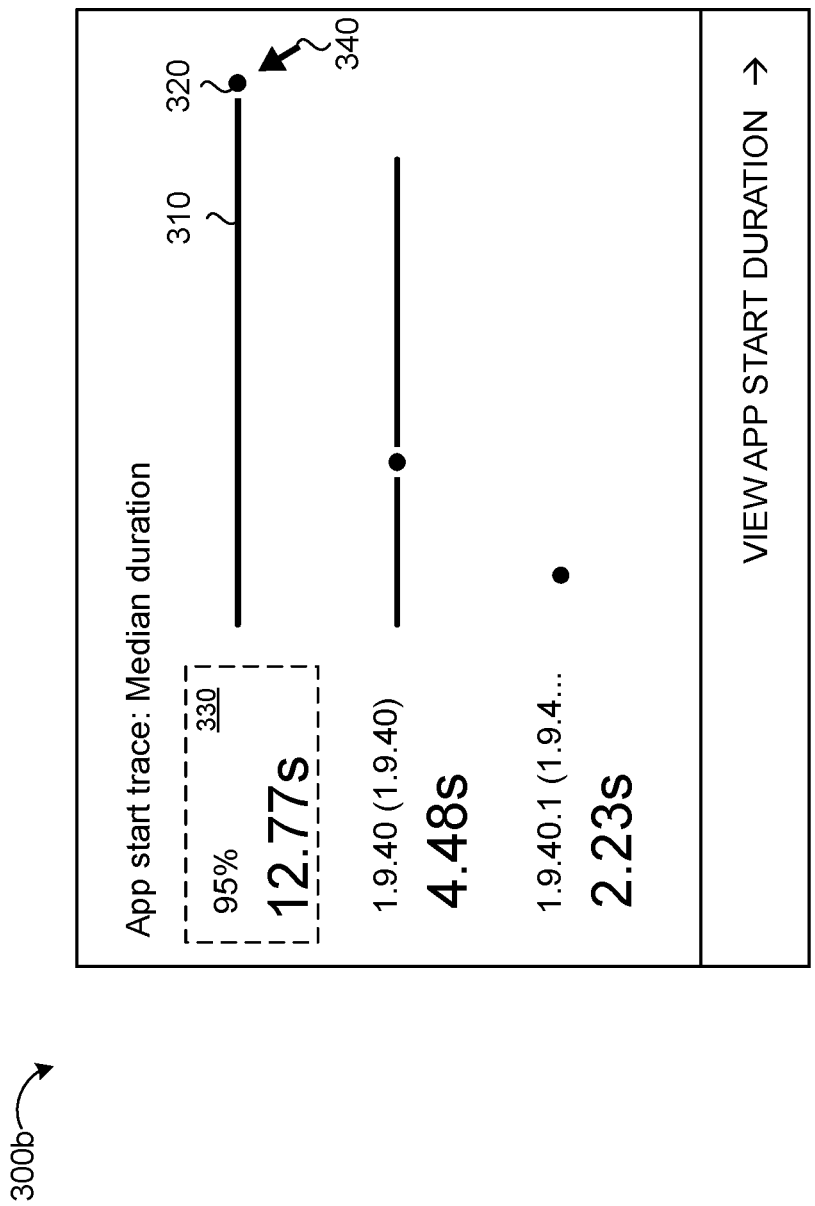
Figure 4A:
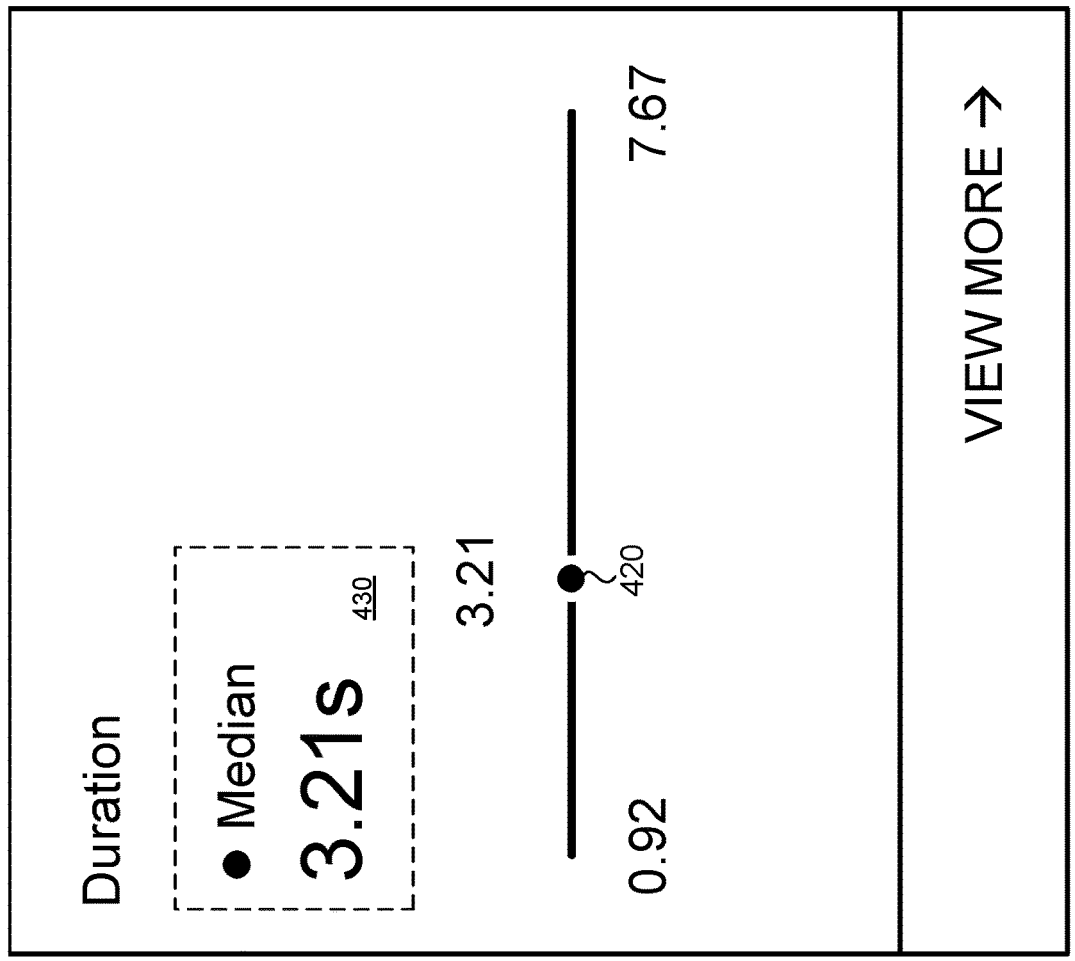
FIGS. 4A and 4B are schematic views of an example user interaction with an interaction point to update interaction data.
Figure 4B:
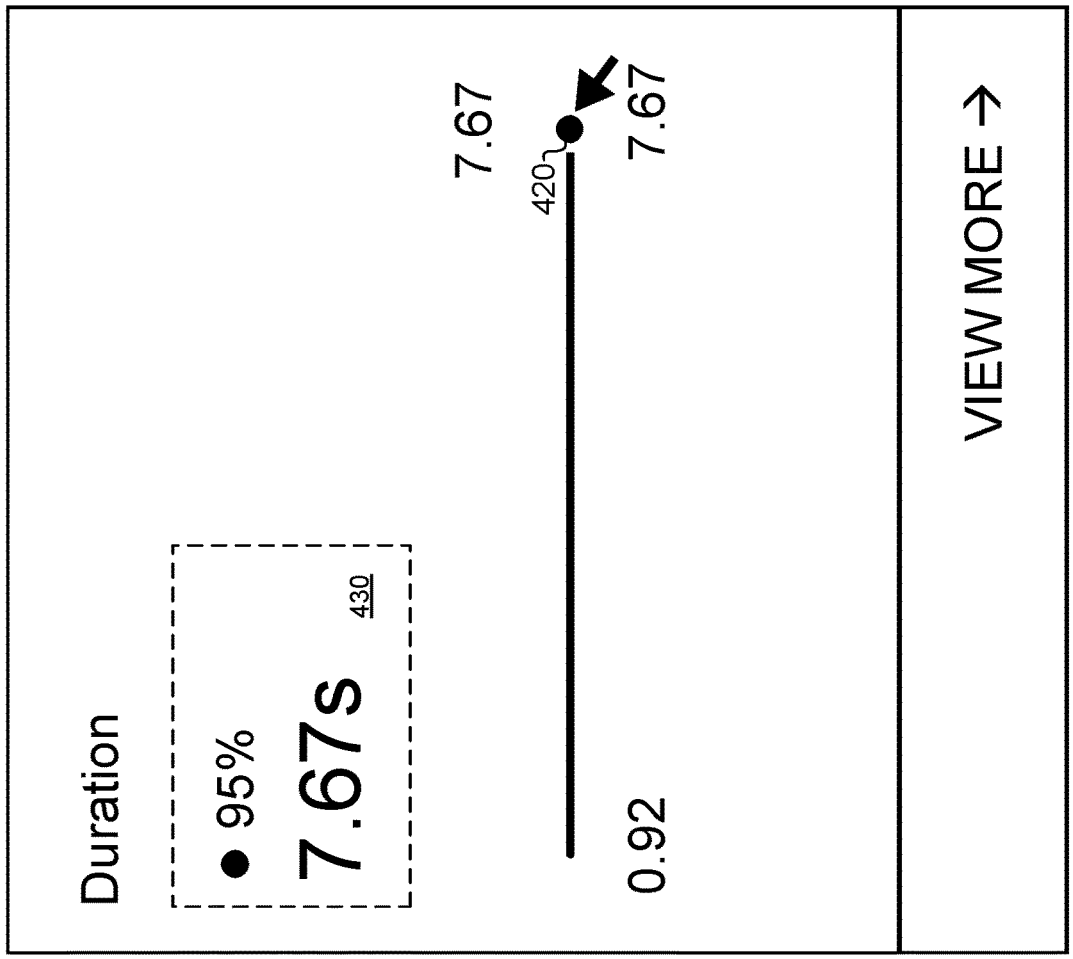
Figure 5A:
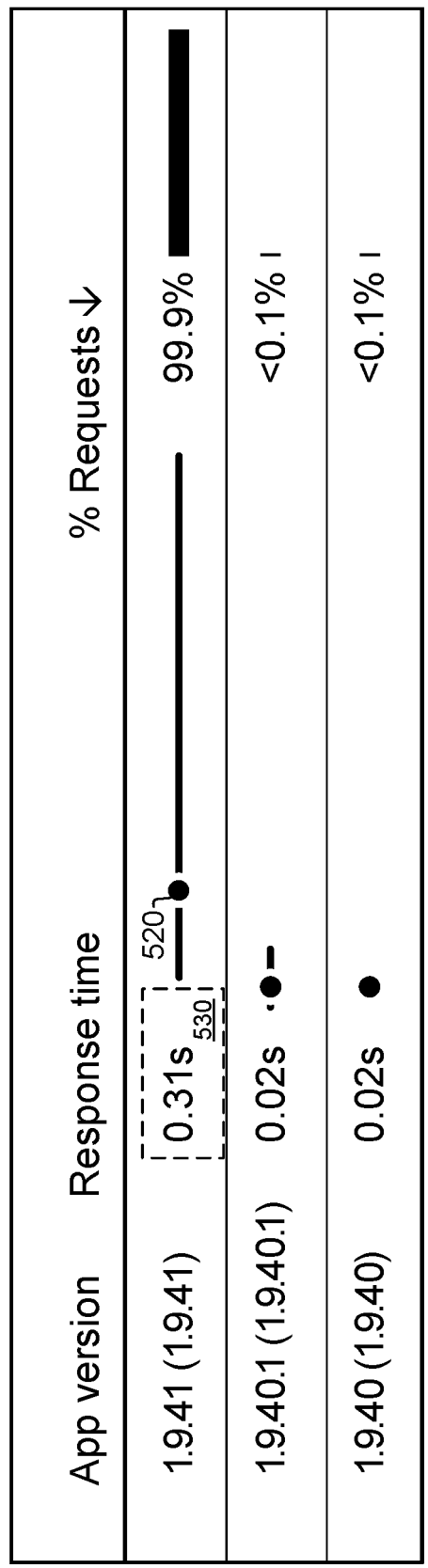
FIGS. 5A and 5B are schematic views of another example user interaction.
Figure 5B:
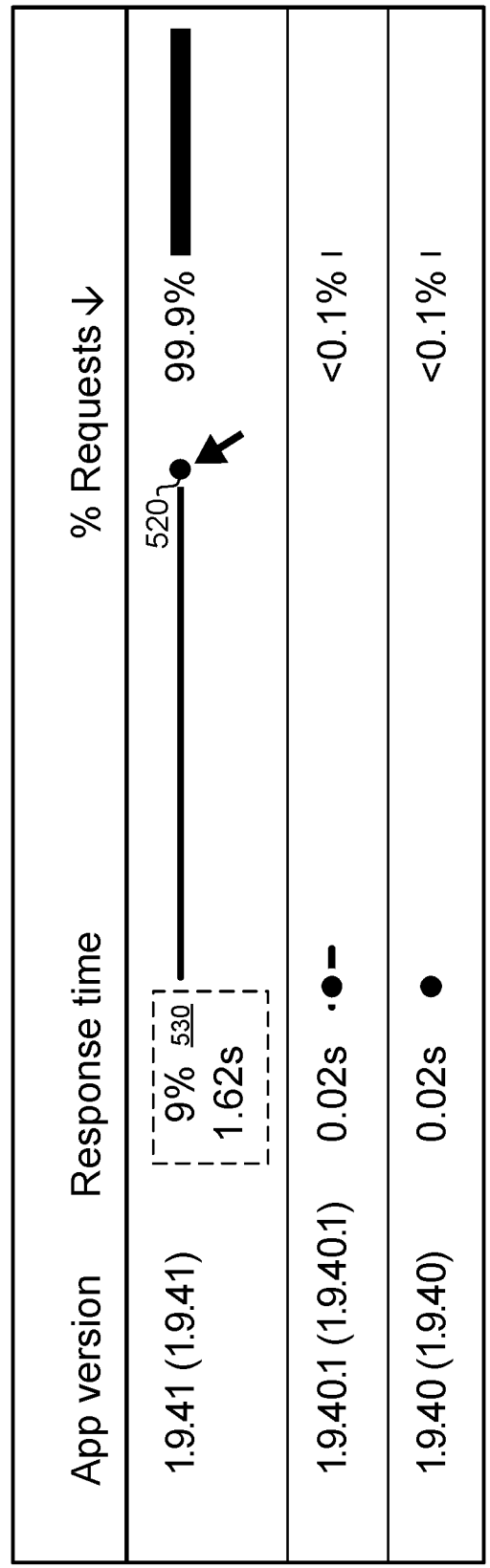

Referring now to FIGS. 3A and 3B, the user 10, in some implementations, interacts with a box-and-whisker plot 310 of view 300a. As shown in FIG. 3A, plot 310 has interaction point 320 and interaction data 330, where the interaction data 330 is representative of the dataset 190 at a location of the interaction point 320. The user 10 interacts with interaction point 320 to change or update the interaction data 330. For example, as shown in FIG. 3B, the user 10 may "slide" (for example, with cursor 340) the interaction point along an axis of the plot 310 of view 300b and update the interaction data 330. The interaction data 330 may include the value at extreme percentiles (e.g., 95%). FIGS. 4A and 4B show another example of the user 10 interacting with interaction point 420 in views 400a and 400b to update interaction data 430 with a different format found in FIGS. 3A and 3B. As shown in FIGS. 5A and 5B with views 500a and 500b, the interaction point 520 may be positioned at a point where interaction data 530 is updated to beyond the 95th percentile (e.g., 99.9% as illustrated in FIG. 5B).

Figure 6A:
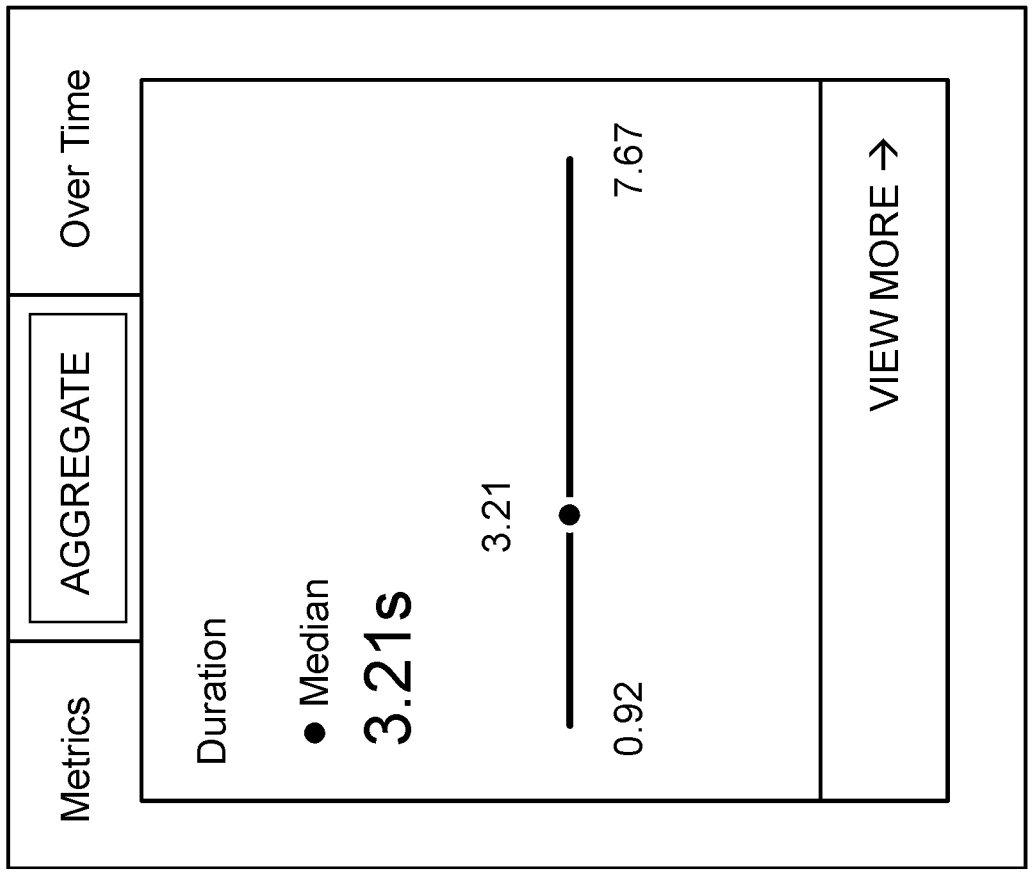
FIGS. 6A-6D are schematic views of example data distribution displays with progressive changes in detail.
Figure 6B:
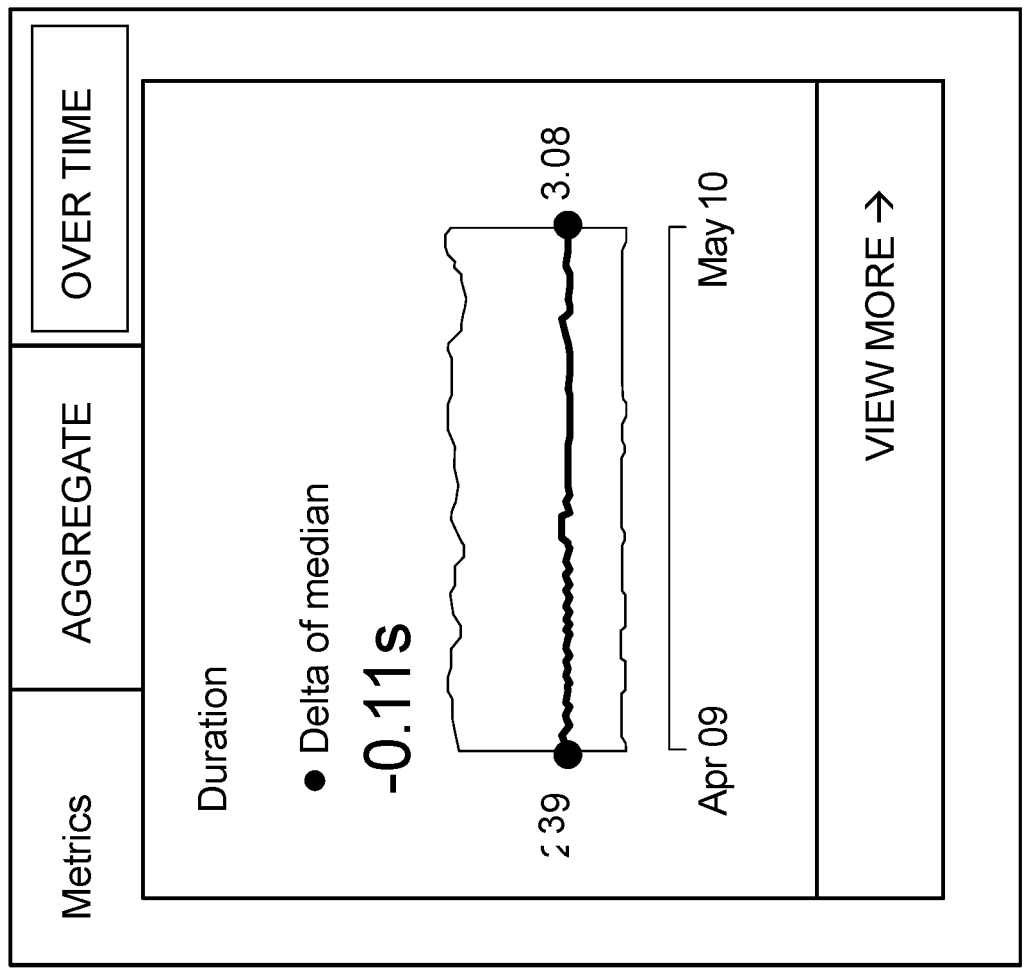
Figure 6C:
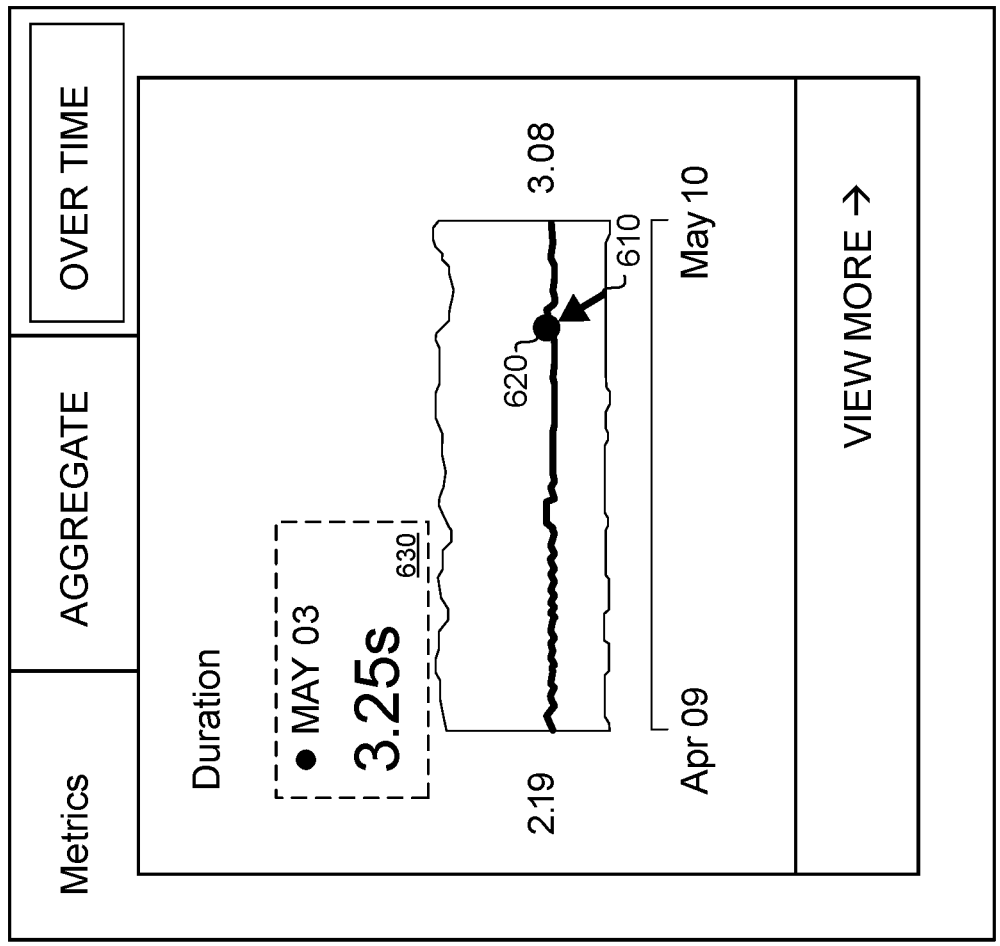
Figure 6D:
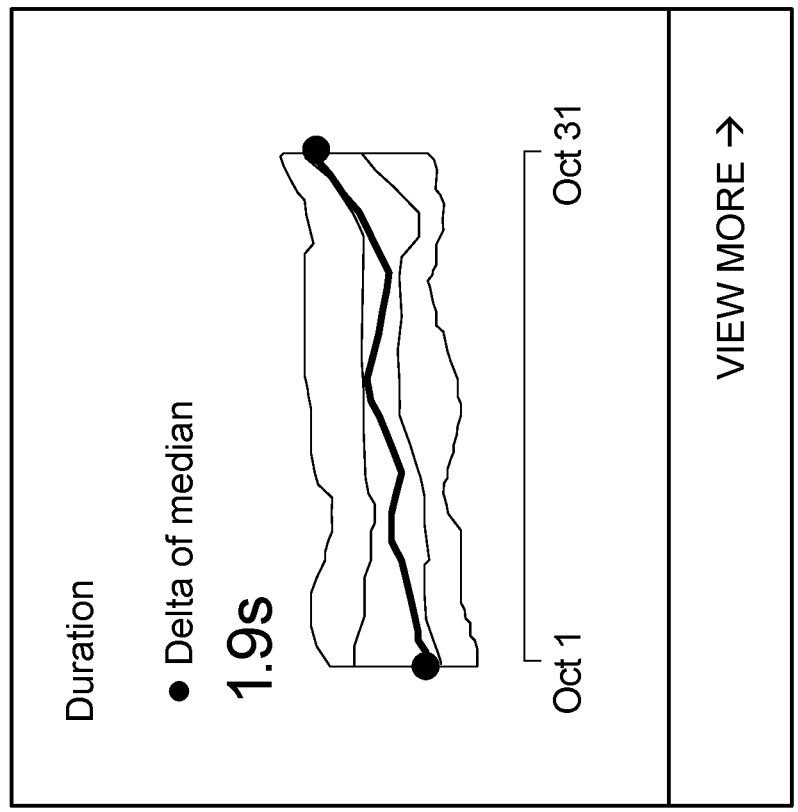

A graphical representation may progressively offer more information to the user 10 based on interaction indications received from the user 10. For example, FIG. 6A shows an aggregate distribution in view 600a, while FIG. 6B shows the same data set after the "OVER TIME" input is selected in view 600b. Then, FIG. 6C shows the user 10 providing an interaction indication 610 at interaction location 620 in view 600c. The interaction data 630 then updates to reflect a value based upon the location of the interaction indication 610. The graphical representations can communicate data in a number of formats. For example, the view 600d of FIG. 6D provides an alternate format to the graphical representation in FIG. 6C that demonstrates how the distribution of data changes over time by graphically indicating how the two inner quartiles (second and third quartiles) change over time. The inner and outer quartiles may be differentiated in a number of ways (e.g., patterns, colors, etc.).

Figure 7:
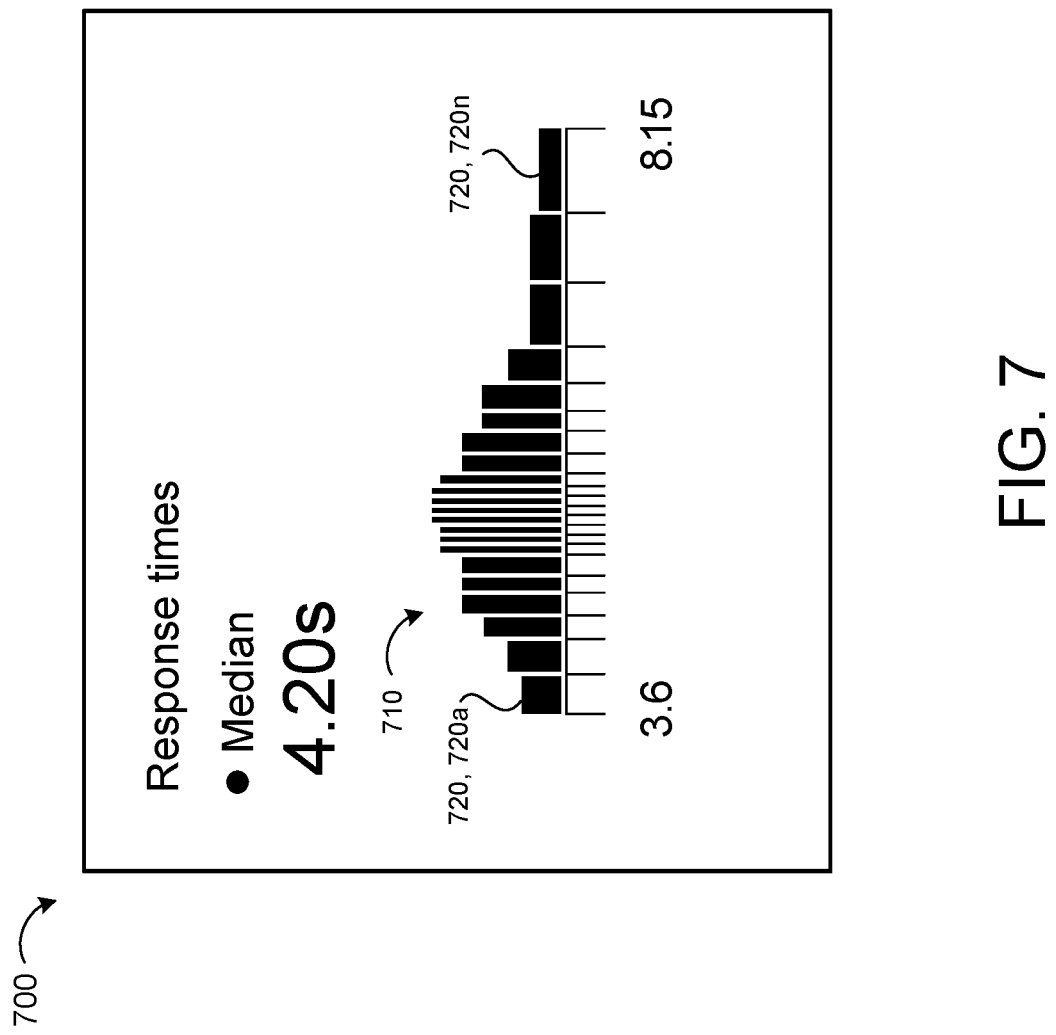
FIG. 7 is a schematic view of an example density plot with bars.
Figure 8A:
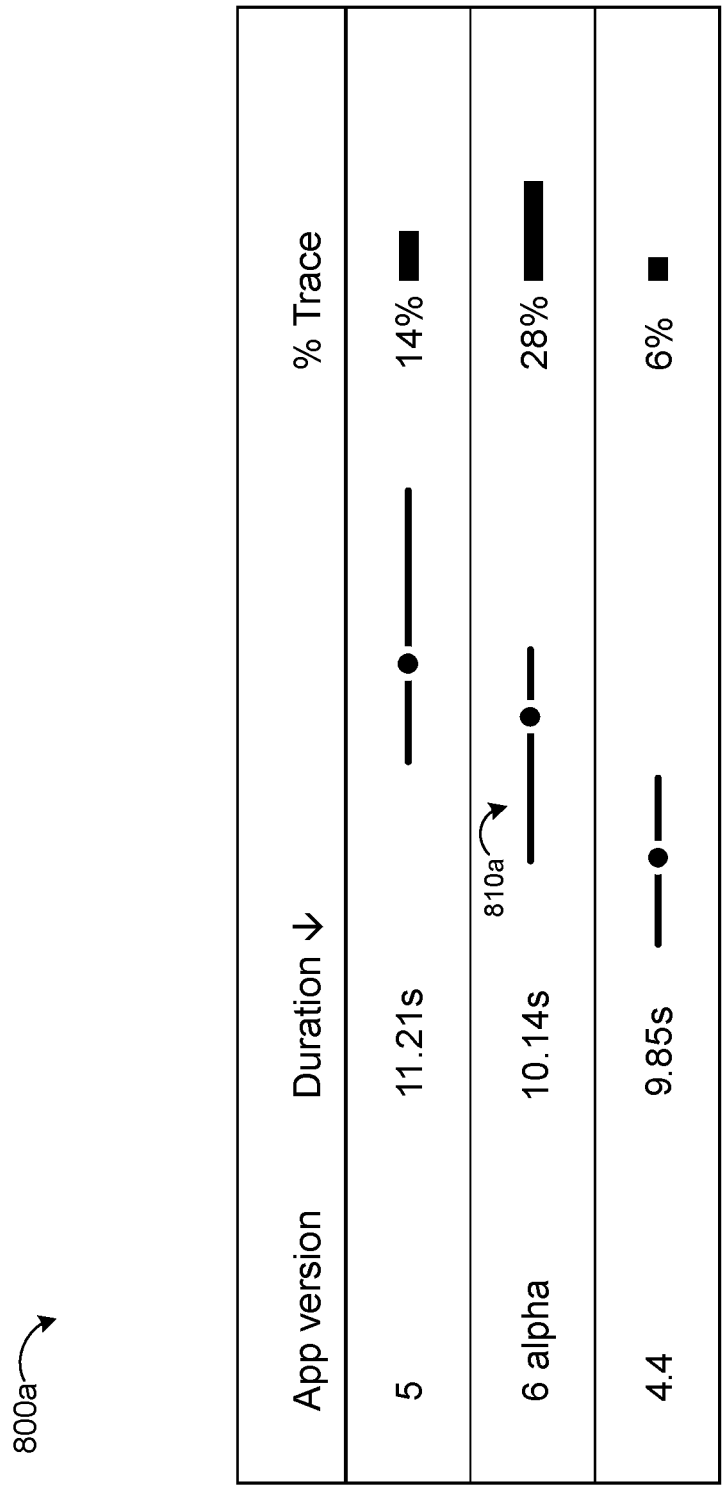
FIGS. 8A and 8B are schematic views of another example user interaction.
Figure 8B:
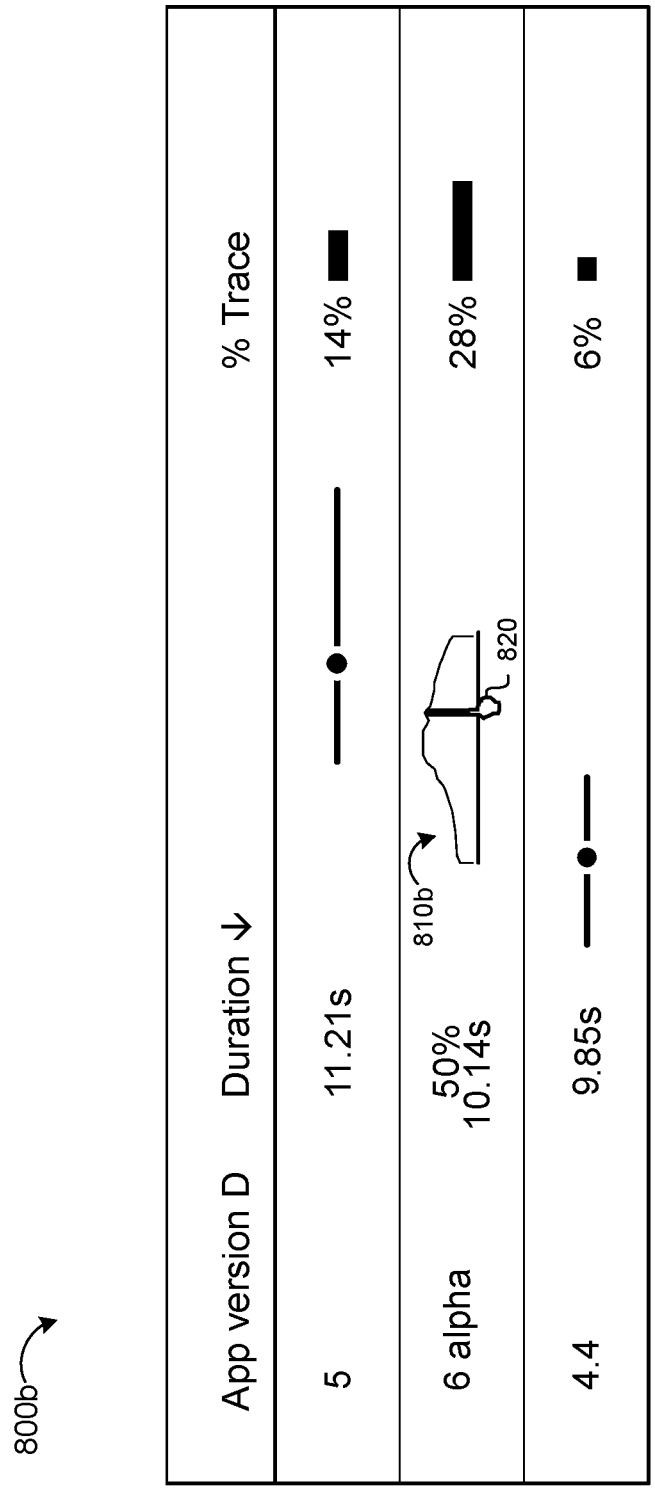

As an alternative or in addition to the curved density plot 210b illustrated in FIG. 2B, the schematic view 700 of FIG. 7 shows the data processing hardware 112 displaying a density plot with a density chart 710. The density chart 710 (including bars or rectangles) may be displayed as the result of receiving additional user interaction indications (e.g., a mouse click) or may be displayed in lieu of the curved density plot 210b. The bar chart 710 includes a number of rectangles 720, 720a-n, where each rectangle 720 may have different widths and heights, but all rectangles 720 may have the same area, such that each rectangle represents a normalized portion of the dataset 190. Similar to the box-and-whisker plots of FIGS. 2A and 2B, the schematic views 800a, 800b of FIGS. 8A and 8B illustrate a box-and-whisker data distribution 810a (FIG. 8A) transforming into a density plot data distribution 810b (FIG. 8B) in response to user interaction 820.

Figure 9:
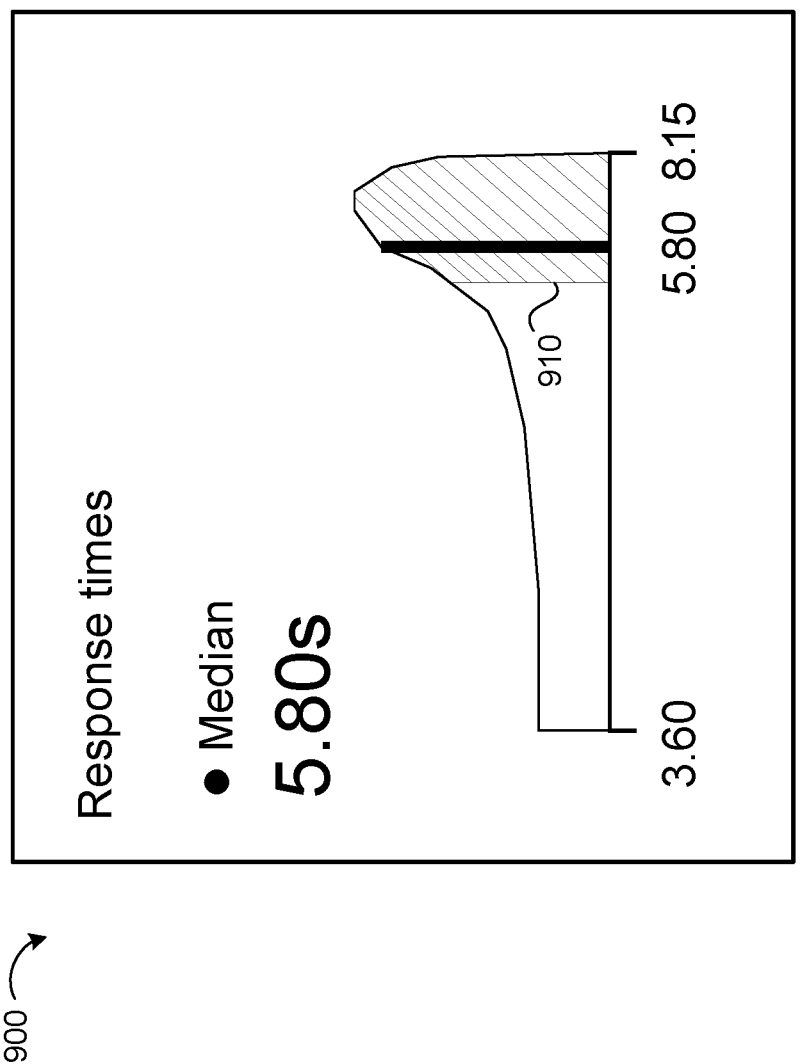
FIG. 9 is a schematic view of an example threshold of a data distribution display.
Figure 10:
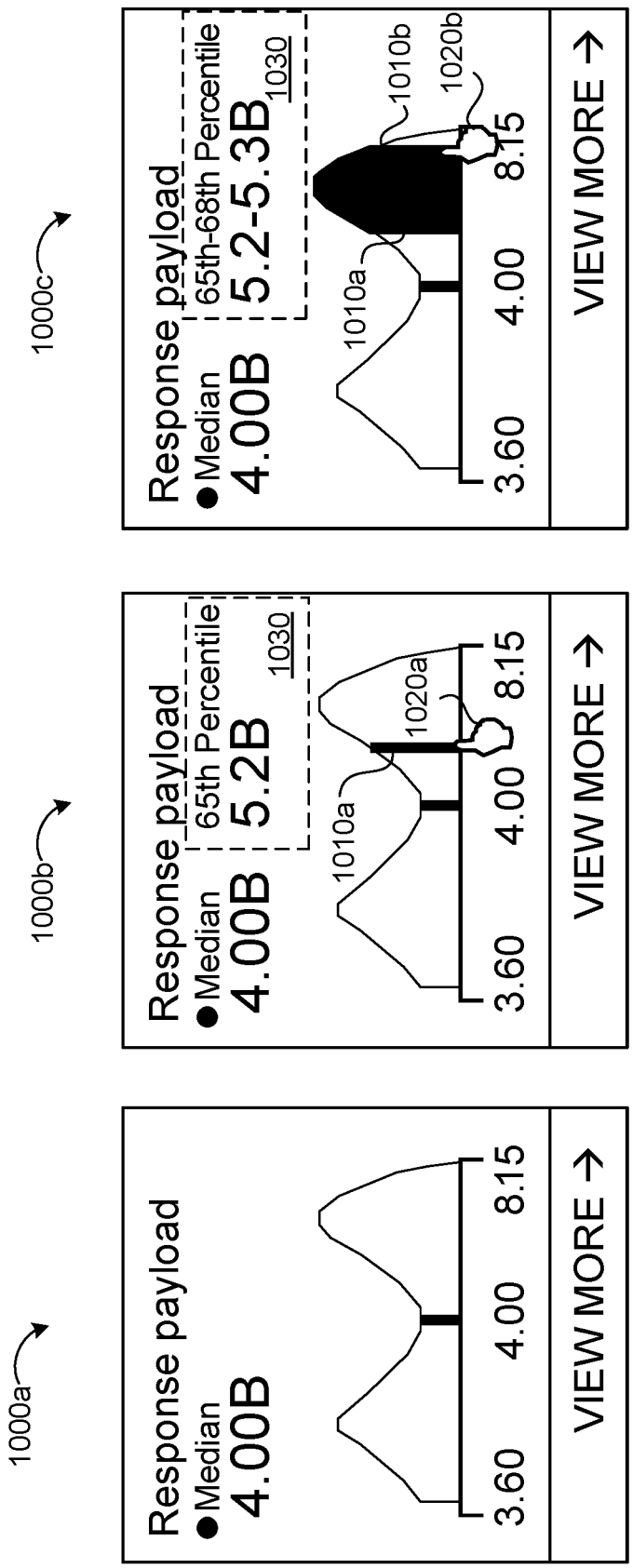
FIGS. 10A-10C are schematic views of user interactions adding boundaries to a data distribution display.
Figure 11:
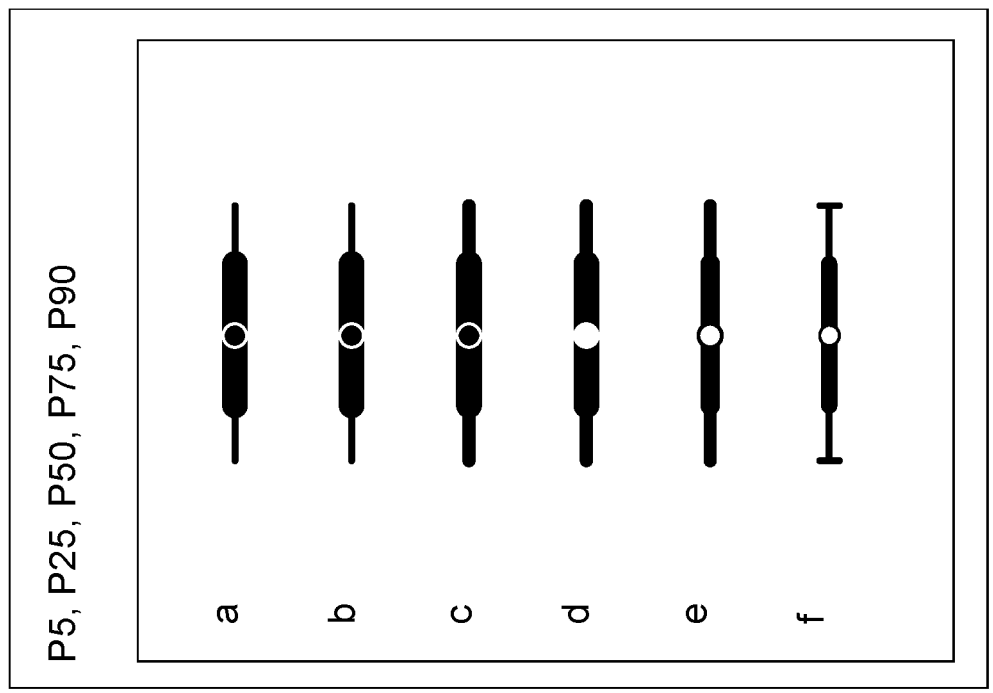
FIG. 11 is a schematic view are example box-and-whisker plots.

Referring now to FIG. 9, schematic view 900 illustrates a user-definable threshold 910 that may be represented by patterns (e.g., hatching) or differing colors. The graphical representations may also display user-definable boundaries. The schematic view 1000a of FIG. 10A illustrates a density curve with no boundaries. The schematic view 1000b of FIG. 10B shows the user 10 defining a first boundary 1010a with interaction indication 1020a. Interaction data 1030 updates with information pertaining to the first boundary 1010a. The user 10 then defines a second boundary 1010b with second interaction indication 1020b as shown by the schematic view 1000c of FIG. 10C. Accordingly, the interaction data 1030 updates with additional data pertaining to the second boundary 1010b. The user 10 may add the boundaries with the use of "handles," similar to text selection on modern smart phones. The schematic view 1100 of FIG. 11 shows example graphical representations representing the second and third quartiles. The quartiles may be represented with various different styles. For example, the thickness, patterns, and/or colors of the lines may be added are adjusted by the user as needed.

Figure 12A:
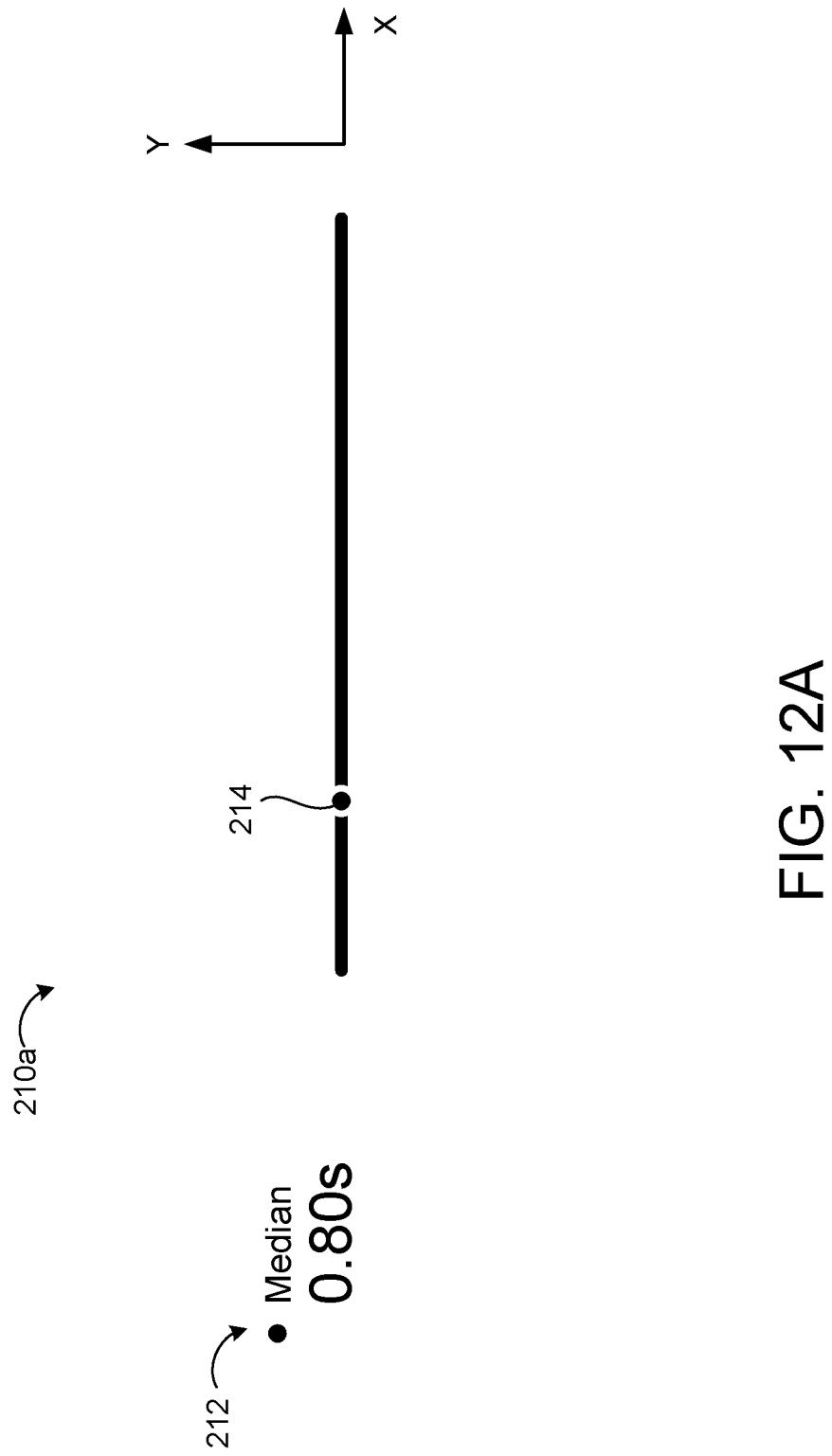
FIGS. 12A-12F are schematic views illustrating an example transition from a line to a curve.
Figure 12B:
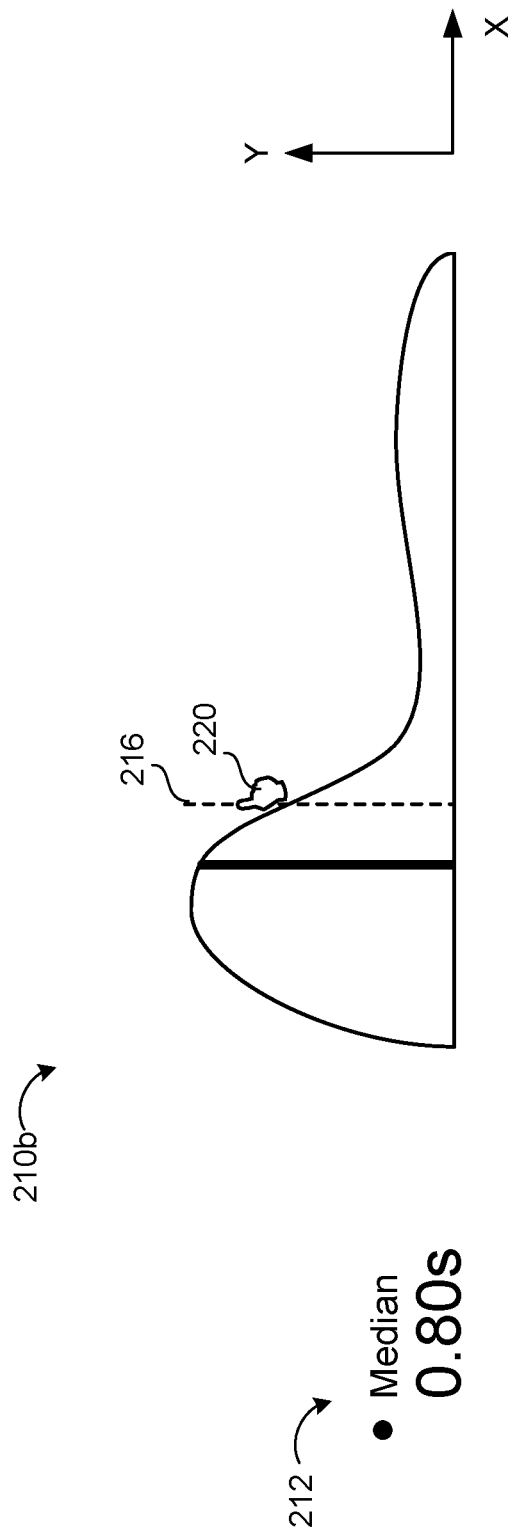
Figure 12C:
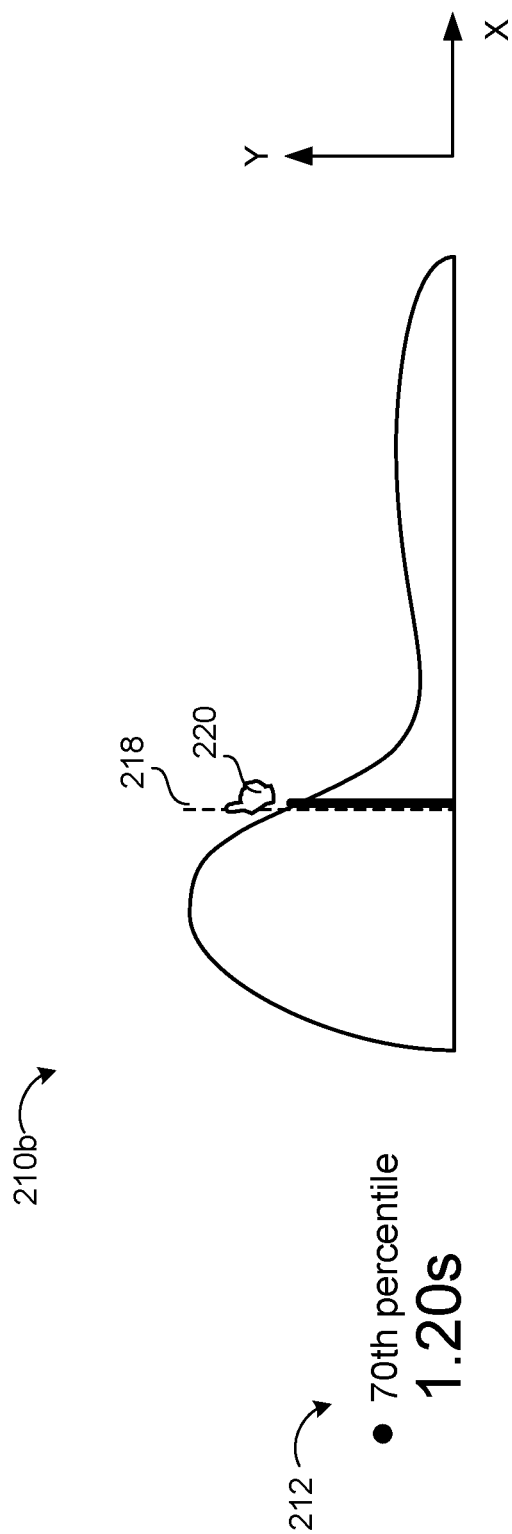
Figure 12D:
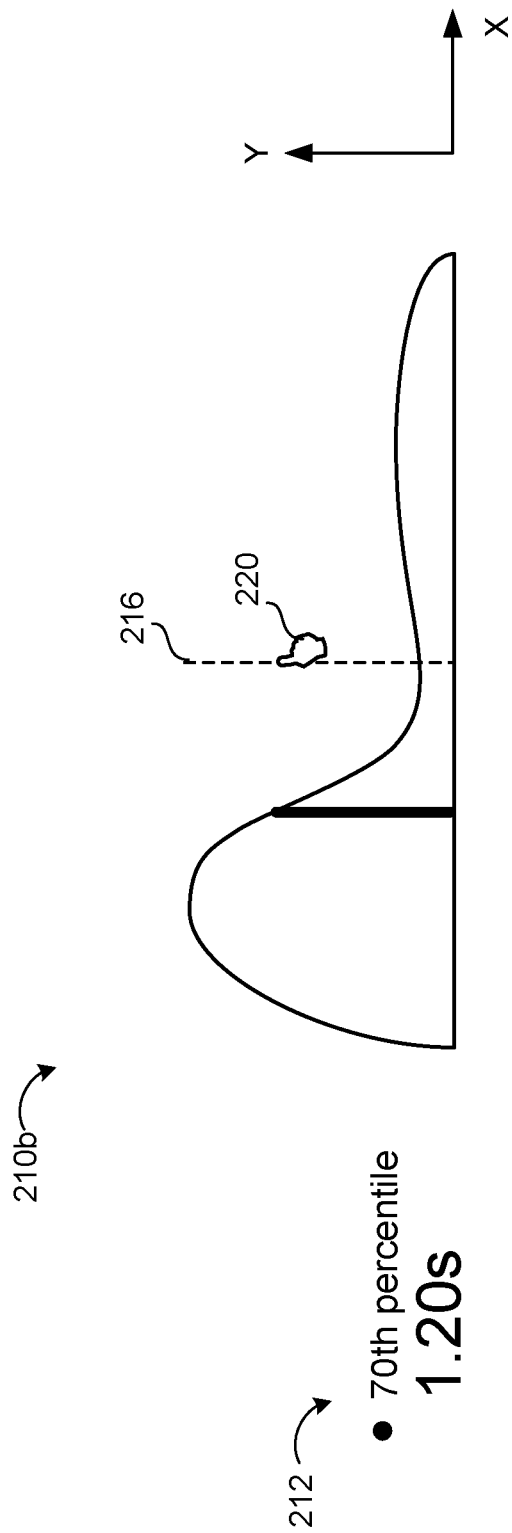
Figure 12E:
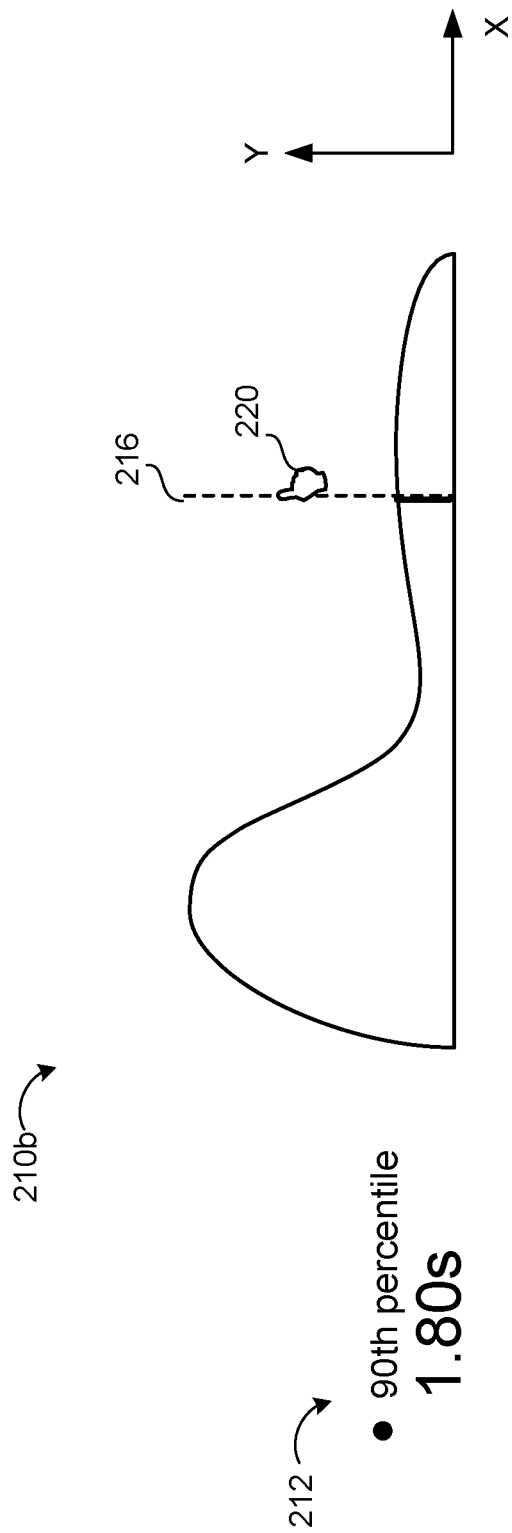
Figure 12F:
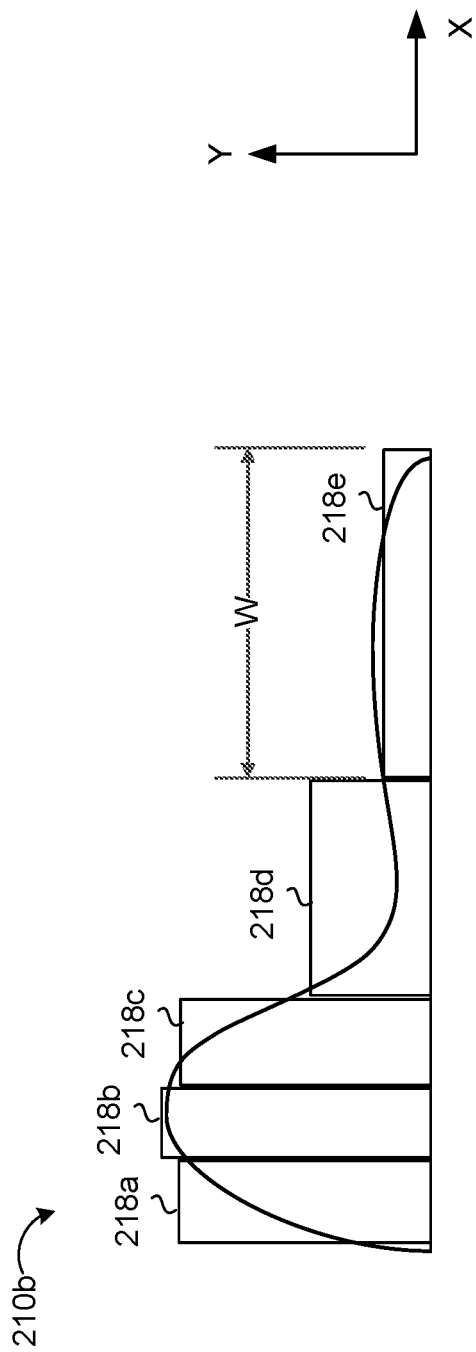

FIGS. 12A-12F illustrate a transition from a line to a curve on a graph. In the examples shown here, the graph expands on the Y axis only at first and then moves to the X axis so that there is continuity. FIG. 12A provides an example first graphical representation 210a of a box and whisker plot (without a box) of a dataset and accompanying text 212 corresponding to a position of a whisker 214. FIG. 12B illustrates providing visual feedback of a user interaction 220 at respective location on the first graphical representation 210a, which changes to a second graphical representation 210b at a corresponding crosshair 216 (e.g., vertical line) as the first graphical representation 210a expands on the Y-axis only. FIG. 12C illustrates, after a delay, how the chart (the second graphical representation 210b) automatically moves the line 216 to the location of the user interaction 220 (e.g., hover, select (click), select and hold, etc.) and adjusts the text representation 212 of the location of the user interaction 220. FIG. 12D illustrates another user interaction 220 at a second location. In this case, however, the text representation 212 does not update and a new added crosshair or line 216 continues to give the user feedback to show that the system is not broken or frozen. FIG. 12E illustrates yet another user interaction 220 at a third location where the chart (the second graphical representation 210b) changes and the text representation 212 changes accordingly as well. In FIG. 12F, the chart (the second graphical representation 210b) includes a rough abbreviation (or approximation) of hotspot regions 18a-e. A width W of each hotspot region 18a-e may vary. The crosshair provides visual feedback to the user to avoid confusion on how the graph functions.

Figure 13:
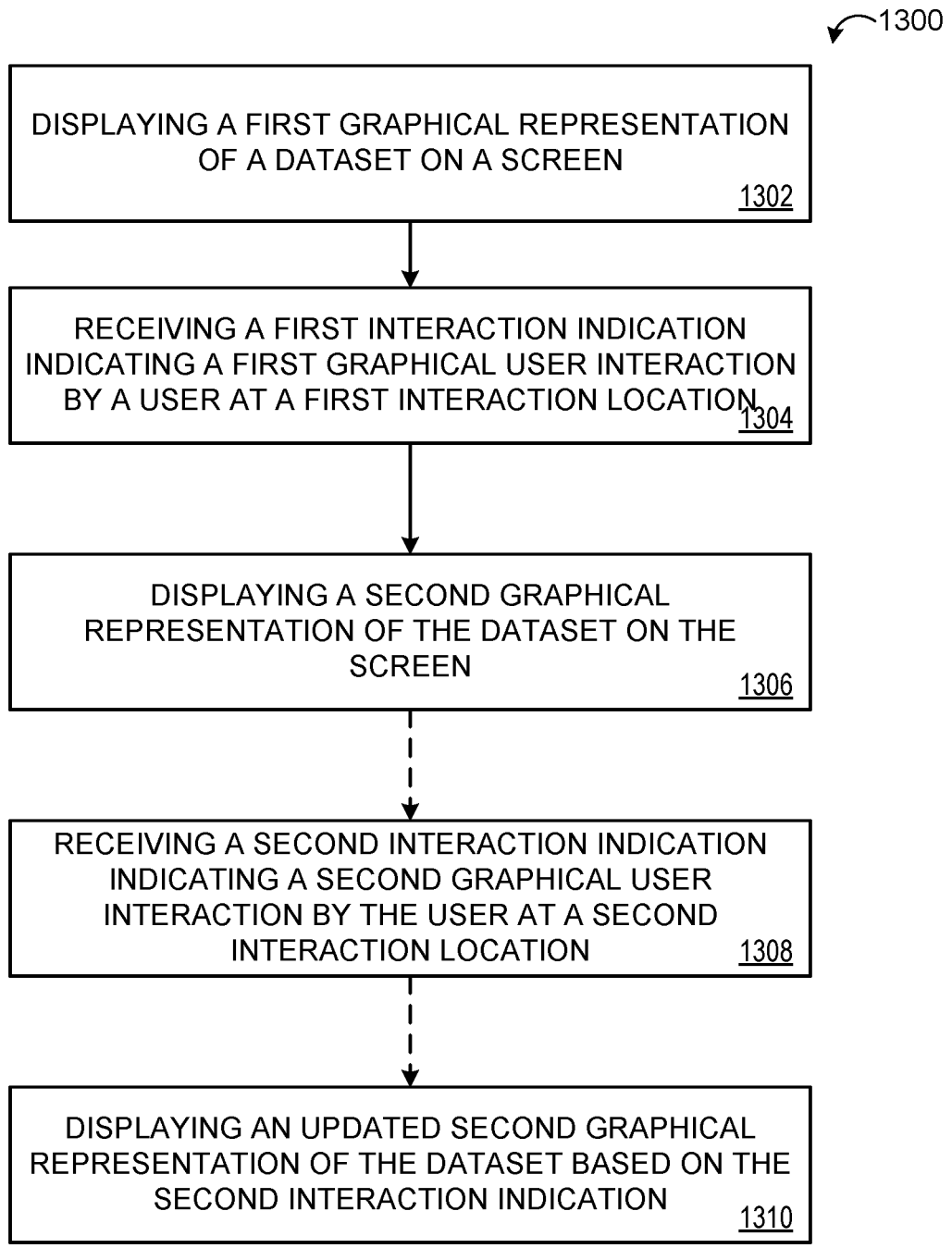
FIG. 13 is a flowchart providing an example arrangement of operations for a method of interactively displaying data distributions.

FIG. 13 is a flowchart of an example method 1300 for interactively displaying a data distribution. The flowchart starts at operation 1302 by displaying, by the data processing hardware 112, a first graphical representation 210a on a screen 116 in communication with the data processing hardware 112, wherein the first graphical representation 210a includes a box-and-whisker plot of a dataset. The first graphical representation 210a may include an axis 240a.

At operation 1304, the method 1300 includes receiving, at the data processing hardware 112, a first interaction indication 220 indicating a graphical user interaction by a user 10 at a first interaction location 203 on the first graphical representation 210a. In some examples, the first interaction location 230 includes a location within a threshold distance of the axis 240a of the first graphical representation 210a. Optionally, the first interaction indication 220 may include a location of an on-focus event triggered on the first graphical representation 210a. The first interaction indication 220 may also include a location of an input selection event triggered on the first graphical representation 210a. At operation 1306, the method 1300 includes, in response to the received first interactive indication 220, displaying, by the data processing hardware 112, a second graphical representation 210b on the screen 116 based on the first interaction indication 230. The second graphical representation 210b includes a density plot of the dataset 190 that may have a respective scale equal to a corresponding scale of the box-and-whisker plot. In some examples, the density plot includes a plurality of rectangles 720, wherein each rectangle 720a-n has an identical area and each rectangle 720a-n has a height and a width based upon the dataset 190.

At operation 1308, the method 1300 includes receiving, at the data processing hardware 112, a second interaction indication 260 indicating the graphical user interaction by the user 10 at a second interaction location 270 on the second graphical representation 210b. In some implementations, the second interaction indication 260 includes a location of an on-focus event triggered on the second graphical representation 210b. The second interaction location 270 may include a location on the second graphical representation 210b that is different than the first interaction location 230. Alternatively, the second interaction location 270 includes a location on the density plot and the density plot includes a graphical indication 250 of a data value corresponding to the second interaction location 270

At operation 1310, the method 1300 includes, in response to the received second interactive indication 260, displaying, by the data processing hardware 112, an updated second graphical representation 210c of the dataset 190 on the screen 116 based on the second interaction indication 260. In some implementations, the second graphical indication 210b includes a first graphical indication and the updated second graphical representation 210c includes a second graphical indication that is different than the first graphical indication.

In some examples, the method 1300 includes receiving, at the data processing hardware 112, a third interaction indication indicating the graphical user interaction at a third interaction location on the second graphical representation. In response to the received third interaction indication, the method 1300 includes displaying, by the data processing hardware 112, the first graphical representation 210a on the screen 119.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 14:
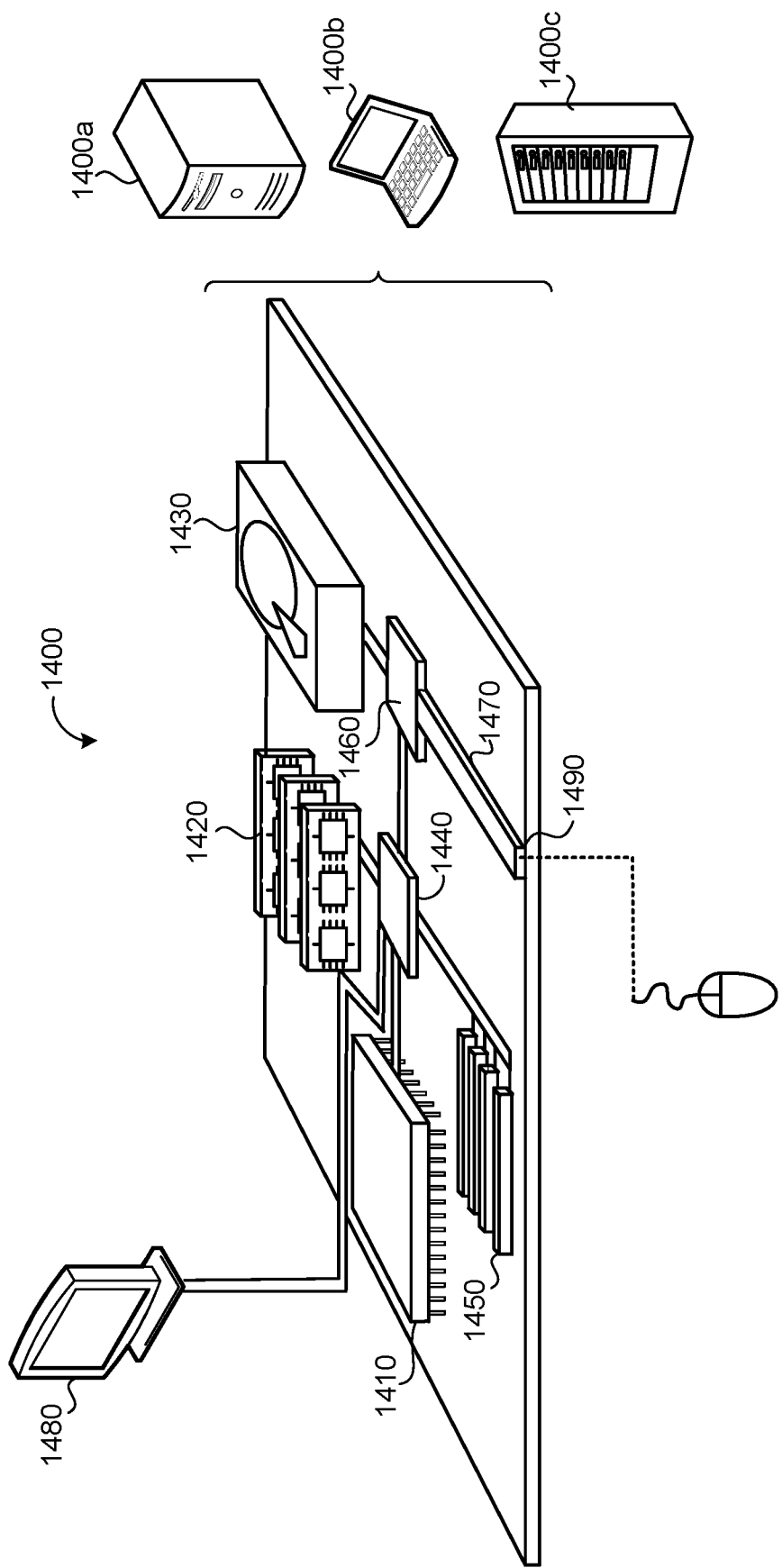
FIG. 14 is a schematic view of an example computing device that may be used to implement the systems and methods described herein.

FIG. 14 is schematic view of an example computing device 1400 that may be used to implement the systems and methods described in this document. The computing device 1400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1400 includes a processor 1410, memory 1420, a storage device 1430, a high-speed interface/controller 1440 connecting to the memory 1420 and high-speed expansion ports 1450, and a low speed interface/controller 1460 connecting to a low speed bus 1470 and a storage device 1430. Each of the components 1410, 1420, 1430, 1440, 1450, and 1460, are interconnected using various busses, and may be mounted on a common motherboard or in other manners as appropriate. The processor 1410 can process instructions for execution within the computing device 1400, including instructions stored in the memory 1420 or on the storage device 1430 to display graphical information for a graphical user interface (GUI) on an external input/output device, such as display 1480 coupled to high speed interface 1440. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1420 stores information non-transitorily within the computing device 1400. The memory 1420 may be a computer-readable medium, a volatile memory unit(s), or non-volatile memory unit(s). The non-transitory memory 1420 may be physical devices used to store programs (e.g., sequences of instructions) or data (e.g., program state information) on a temporary or permanent basis for use by the computing device 1400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1430 is capable of providing mass storage for the computing device 1400. In some implementations, the storage device 1430 is a computer-readable medium. In various different implementations, the storage device 1430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1420, the storage device 1430, or memory on processor 1410.

The high speed controller 1440 manages bandwidth-intensive operations for the computing device 1400, while the low speed controller 1460 manages lower bandwidth-intensive operations. Such allocation of duties is exemplary only. In some implementations, the high-speed controller 1440 is coupled to the memory 1420, the display 1480 (e.g., through a graphics processor or accelerator), and to the high-speed expansion ports 1450, which may accept various expansion cards (not shown). In some implementations, the low-speed controller 1460 is coupled to the storage device 1430 and a low-speed expansion port 1490. The low-speed expansion port 1490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1400*a* or multiple times in a group of such servers 1400*a*, as a laptop computer 1400*b*, or as part of a rack server system 1400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   displaying, via a graphical user interface (GUI), a first graphical representation of a dataset on a display screen in communication with the data processing hardware, the first graphical representation representing a statistical summary of the dataset, the first graphical representation is a box-and-whiskers plot of the dataset;
   receiving, via the GUI, an indication of a user interaction on the first graphical representation; and
   in response to the received indication of the user interaction, displaying, via the GUI, a second graphical representation of the dataset on the display screen, the second graphical representation representing a plurality of statistical summaries of the dataset, the second graphical representation comprising a second graph of the dataset, the second graph extends from a single time axis that the second graph shares with the box-and-whiskers plot, wherein each respective statistical summary of the plurality of statistical summaries computed for a respective time period of a plurality of time periods.

2. The computer-implemented method of claim 1, wherein the second graphical representation comprises:
   a first line representing a plot of a plurality of medians of the dataset for respective ones of the plurality of time periods of the dataset; and
   a second line representing a plot of a plurality of quartiles of the dataset for respective ones of the plurality of time periods of the dataset.

3. The computer-implemented method of claim 1, wherein the statistical summary of the dataset represents at least one of a median, a first quartile, a second quartile, a third quartile, or a fourth quartile of the dataset.

4. The computer-implemented method of claim 1, wherein the statistical summary of the first graphical representation is depicted using a first orientation and the plurality of statistical summaries of the second graphical representation are depicted using a second orientation different from the first orientation.

5. The computer-implemented method of claim 1, wherein the second graphical representation depicts how statistics of the dataset vary with time.

6. The computer-implemented method of claim 1, wherein the operations further comprise:
   receiving, via the GUI, an indication of a second user interaction at an interaction location on the second graphical representation; and
   in response to the received indication of the second user interaction at the interaction location on the second graphical representation, identifying, via the GUI, the time period of the plurality of time periods that is associated with the interaction location.

7. The computer-implemented method of claim 6, wherein the operations further comprise, in response to the received indication of the second user interaction at the interaction location on the second graphical representation, identifying, via the GUI, a statistical characteristic of the dataset for the time period of the plurality of time periods associated with the interaction location.

8. The computer-implemented method of claim 1, wherein the user interaction comprises a selection of an element of the GUI.

9. A system comprising:
   data processing hardware; and
   memory hardware in communication with the data processing hardware, the memory hardware storing instructions that when executed on the data processing hardware cause the data processing hardware to perform operations comprising:
      displaying, via a graphical user interface (GUI), a first graphical representation of a dataset on a display screen in communication with the data processing hardware, the first graphical representation representing a statistical summary of the dataset, the first graphical representation is a box-and-whiskers plot of the dataset;
      receiving, via the GUI, an indication of a user interaction on the first graphical representation; and
      in response to the received indication of the user interaction, displaying, via the GUI, a second graphical representation of the dataset on the display screen, the second graphical representation representing a plurality of statistical summaries of the dataset, the second graphical representation comprising a second graph of the dataset, the second graph extends from a single time axis that the second graph shares with the box-and-whiskers plot, wherein each respective statistical summary of the plurality of statistical summaries computed for a respective time period of a plurality of time periods.

10. The system of claim 9, wherein the second graphical representation comprises:
    a first line representing a plot of a plurality of medians of the dataset for respective ones of the plurality of time periods of the dataset; and
    a second line representing a plot of a plurality of quartiles of the dataset for respective ones of the plurality of time periods of the dataset.

11. The system of claim 9, wherein the statistical summary of the dataset represents at least one of a median, a first quartile, a second quartile, a third quartile, or a fourth quartile of the dataset.

12. The system of claim 9, wherein the statistical summary of the first graphical representation is depicted using a first orientation different and the plurality of statistical summaries of the second graphical representation are depicted using a second orientation different from the first orientation.

13. The system of claim 9, wherein the second graphical representation depicts how statistics of the dataset vary with time.

14. The system of claim 9, wherein the operations further comprise:
    receiving, via the GUI, an indication of a second user interaction at an interaction location on the second graphical representation; and
    in response to the received indication of the second user interaction at the interaction location on the second graphical representation, identifying, via the GUI, the time period of the plurality of time periods that is associated with the interaction location.

15. The system of claim 14, wherein the operations further comprise, in response to the received indication of the second user interaction at the interaction location on the second graphical representation, identifying, via the GUI, a statistical characteristic of the dataset for the time period of the plurality of time periods associated with the interaction location.

16. The system of claim 9, wherein the user interaction comprises a selection of an element of the GUI.

\* \* \* \* \*